United States Patent
Kim et al.

(10) Patent No.: US 10,133,280 B2
(45) Date of Patent: Nov. 20, 2018

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Sungmin Kim, Seoul (KR); Xavier Punithan, Karnataka (IN); Hyunho Ki, Seoul (KR); Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/625,234

(22) Filed: Jun. 16, 2017

(65) Prior Publication Data

US 2017/0371349 A1 Dec. 28, 2017

Related U.S. Application Data

(60) Provisional application No. 62/354,087, filed on Jun. 23, 2016.

(30) Foreign Application Priority Data

Mar. 16, 2017 (KR) .................. 10-2017-0033338

(51) Int. Cl.
*G01C 22/00* (2006.01)
*G05D 1/00* (2006.01)
(Continued)

(52) U.S. Cl.
CPC ......... *G05D 1/0276* (2013.01); *G05D 1/0274* (2013.01); *G08G 1/0965* (2013.01); *G05D 2201/0213* (2013.01)

(58) Field of Classification Search
CPC .. G05D 1/0276; G05D 1/0274; G08G 1/0965; G08G 1/00
(Continued)

(56) References Cited

U.S. PATENT DOCUMENTS

2014/0088855 A1* 3/2014 Ferguson ............... G08G 1/166
701/117
2015/0081202 A1 3/2015 Levin

FOREIGN PATENT DOCUMENTS

KR 10-2013-0091907 8/2013
KR 101439019 9/2014
(Continued)

OTHER PUBLICATIONS

English Translation for KR101439019B1.*
(Continued)

*Primary Examiner* — Mahmoud S Ismail
(74) *Attorney, Agent, or Firm* — Fish & Richardson P.C.

(57) ABSTRACT

The present disclosure relates to a vehicle control device provided in a vehicle and a method of controlling the vehicle. A vehicle control device according to an embodiment of the present disclosure may include a communicator, a sensor, and a processor configured to control the communicator to receive map information from an external server and location information of the another vehicle from the another vehicle, wherein the processor merges the acquired location information of the vehicle and the received location information of the another vehicle into the received map information to control the vehicle based on at least one of the merged map information and the information associated with the vehicle sensed through the sensor.

20 Claims, 19 Drawing Sheets

(51) Int. Cl.
*G05D 1/02* (2006.01)
*G08G 1/0965* (2006.01)
*G06F 19/00* (2018.01)
*G06G 7/70* (2006.01)
*G06G 7/76* (2006.01)
*G08G 1/00* (2006.01)

(58) Field of Classification Search
USPC .................................................. 701/27, 117
See application file for complete search history.

(56) References Cited

FOREIGN PATENT DOCUMENTS

| KR | 101439019 B1 * | 9/2014 |
|---|---|---|
| KR | 10-2015-0060953 | 6/2015 |
| KR | 10-2016-0055571 | 5/2016 |

OTHER PUBLICATIONS

International Search Report and Written Opinion in International Application No. PCT/KR2017/006523, dated Oct. 18, 2017, 15 pages (with English translation).

* cited by examiner

[ V2X-LDM ]

[ eHorizon-ADASIS ]

(a)

(b)

(a)            (b)

(a)

(b)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0033338, filed on Mar. 16, 2017, and also claims the benefit of U.S. Provisional Application No. 62/354,087, filed on Jun. 23, 2016, the contents of which are incorporated by reference herein in their entirety.

BACKGROUND OF THE INVENTION

1. Field of the Invention

This present disclosure relates to a vehicle control device provided in a vehicle and a control method of the vehicle.

2. Background of the Invention

A vehicle is an apparatus capable of moving a user in the user-desired direction, and a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

As part of this effort, in order to effectively transmit eHorizon (electronic Horizon) data to autonomous navigation systems and infotainment systems, the EU OEM (European Union Original Equipment Manufacturing) Association has established a data specification and transmission method as a standard under the name "ADASIS (ADAS (Advanced Driver Assist System) Interface Specification)."

In addition, eHorizon (software) is becoming an integral part of the safety/ECO/convenience of autonomous vehicles in a connected environment.

SUMMARY OF THE INVENTION

An object of the present disclosure is to provide a vehicle control device and a vehicle control method capable of autonomously driving a vehicle in an optimized manner, and a vehicle control method thereof.

Another object of the present disclosure is to provide a vehicle control device capable of outputting a warning message associated with the driving of a vehicle in an optimized situation, and a vehicle control method thereof.

The problems to be solved in the present invention may not be limited to the aforementioned, and other problems to be solved by the present invention will be obviously understood by a person skilled in the art based on the following description.

In order to accomplish the foregoing tasks, a vehicle control device provided in a vehicle according to an embodiment of the present disclosure may include a communication unit formed to acquire the location information of the vehicle and perform communication with at least one of an external server and another vehicle, a sensing unit formed to sense information associated with the vehicle, and a processor configured to control the communication unit to receive map information from the external server and the location information of the another vehicle from the another vehicle, wherein the processor merges the acquired location information of the vehicle and the received location information of the another vehicle into the received map information to control the vehicle based on at least one of the merged map information and the information associated with the vehicle sensed through the sensing unit.

According to an embodiment, the processor may merge the location information of the vehicle and the location information of the another vehicle into the map information in the lane unit.

According to an embodiment, the processor may apply the information associated with the vehicle sensed within a predetermined range through the sensing unit to the map information, and then additionally merge the location information of the another vehicle to control the vehicle.

According to an embodiment, controlling the vehicle may include at least one of autonomously driving the vehicle and outputting a warning message associated with the driving of the vehicle.

According to an embodiment, the communication unit may include a V2X module configured to receive LDM (Local Dynamic Map) data from the another vehicle, and an eHorizon module configured to receive an ADAS (Advanced Driver Assistance System) MAP from the external server, wherein the location information of the another vehicle is included in the LDM data, and the map information is included in the ADAS MAP.

According to an embodiment, the processor may convert a coordinate system of the ADAS MAP received through the eHorizon module into a coordinate system of the LDM data received through the V2X module or convert a coordinate system of the LDM data into a coordinate system of the ADAS MAP.

According to an embodiment, the processor may extract a relative location between the vehicle and another vehicle that has transmitted LDM data based on the LDM data received through the V2X module, and align the extracted relative location of the another vehicle in the lane unit to the ADAS MAP received through the eHorizon module.

According to an embodiment, the processor may control the autonomous driving of the vehicle based on the ADAS MAP in which the relative location of the another vehicle is aligned in the lane unit.

According to an embodiment, the processor may determine whether or not to output a warning message associated with the driving of the vehicle based on the ADAS MAP in which the relative location of the another vehicle is aligned in the lane unit.

According to an embodiment, the processor may output a warning message associated with the driving of the vehicle when a relative location with respect to the another vehicle is less than a preset distance, and may not display a warning message associated with the driving of the vehicle when it is determined that the another vehicle located within the preset distance and the vehicle are traveling in different lanes based on the ADAS MAP aligned in the lane unit.

A vehicle comprising the present disclosure may include a vehicle control device described in the present specification.

A method of controlling a vehicle provided with a vehicle control device according to an embodiment of the present disclosure may include acquiring the location information of the vehicle through a communication unit, and receiving map information from an external server and the location information of another vehicle from the another vehicle, sensing information associated with the vehicle, and merging the acquired location information of the vehicle and the received location information of the another vehicle into the received map information, and controlling the vehicle based on at least one of the merged map information and the sensed information associated with the vehicle.

Moreover, the specific details of embodiments are included in the detailed description and drawings.

According to an embodiment of the present disclosure, there are one or more following effects.

The present disclosure may merge a relative location of another vehicle received through the V2X module and a detailed map received from an external server through the eHorizon module to acquire information capable of determining road information in the lane unit.

In addition, the present disclosure may provide an interface capable of autonomously driving a vehicle in an optimized manner or outputting a warning message associated with driving to a driver in an optimized situation based on information capable of determining road information in the lane unit.

The effects of the present invention may not be limited to those effects, and other effects which have not been mentioned can be obviously understood by those skilled in the art from the appending claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
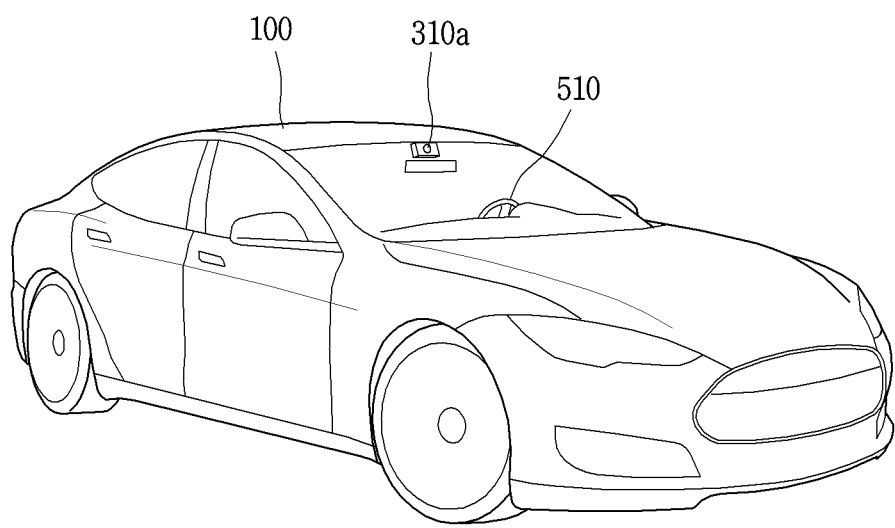
FIG. 1 is a view illustrating an appearance of a vehicle according to an embodiment of the present disclosure.
Figure 1:
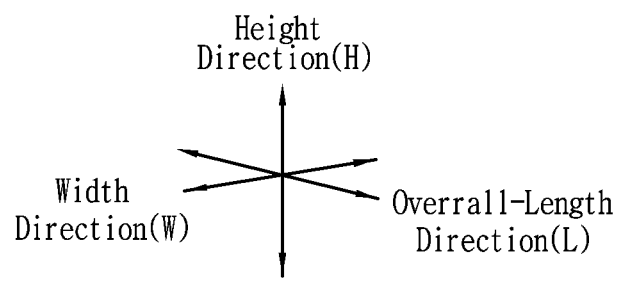

FIG. 1 is a view illustrating appearance of a vehicle in accordance with an embodiment of the present invention.

Figure 2:
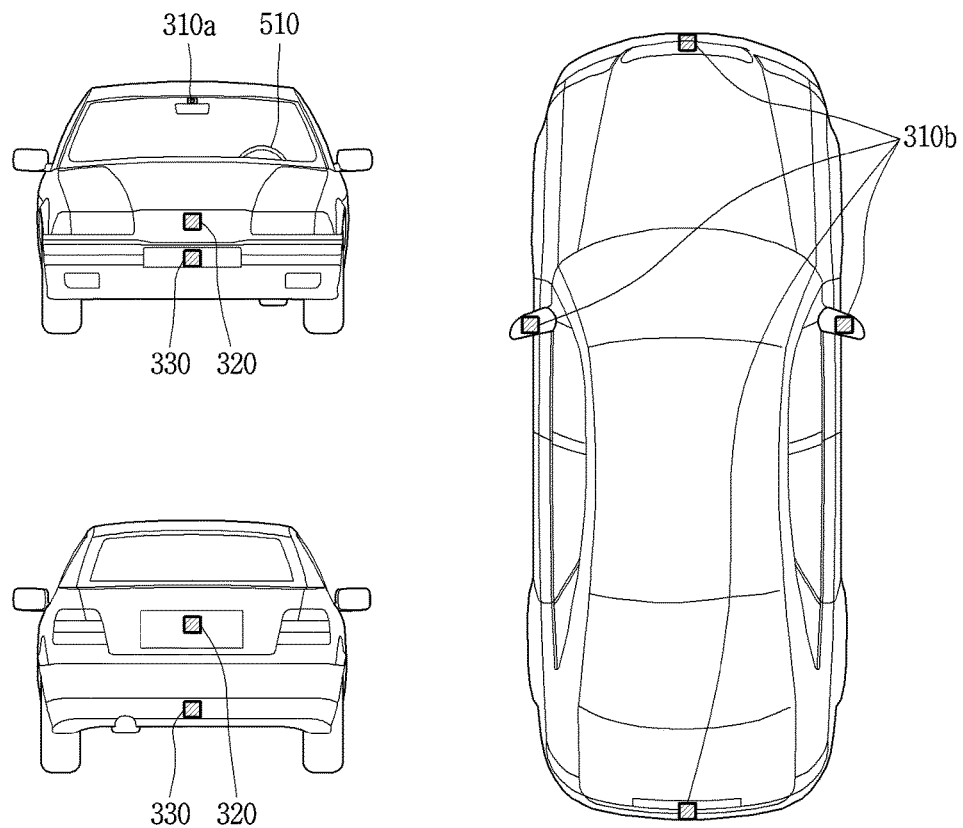
FIG. 2 is a view in which a vehicle according to an embodiment of the present disclosure is seen from various angles.

FIG. 2 is a view illustrating appearance of a vehicle at various angles in accordance with an embodiment of the present invention.

Figure 3:
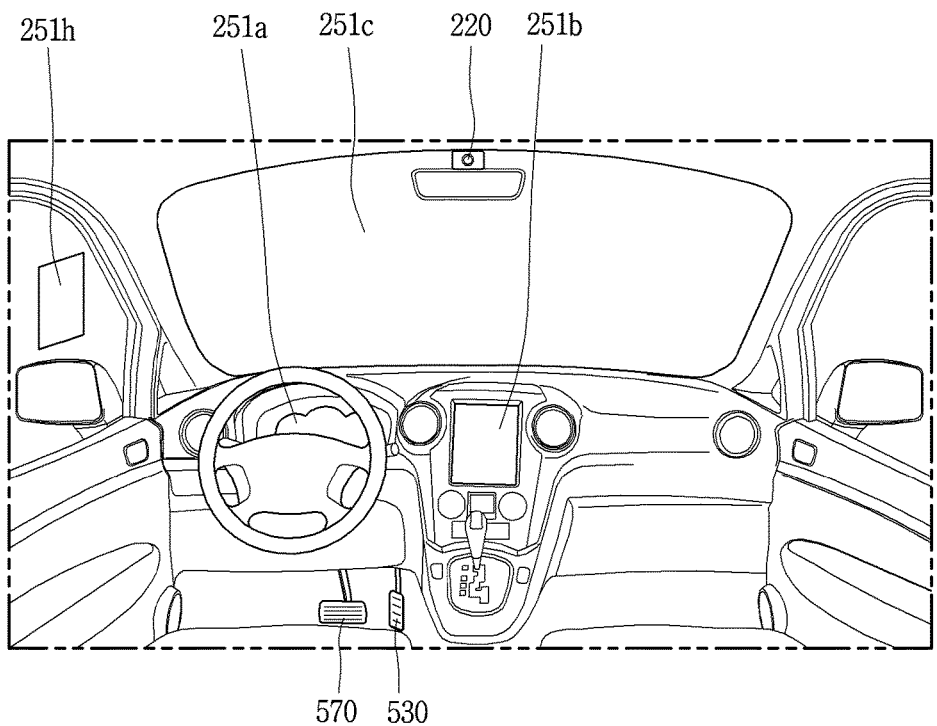
FIGS. 3 and 4 are views illustrating an inside of a vehicle according to an embodiment of the present disclosure.
Figure 4:
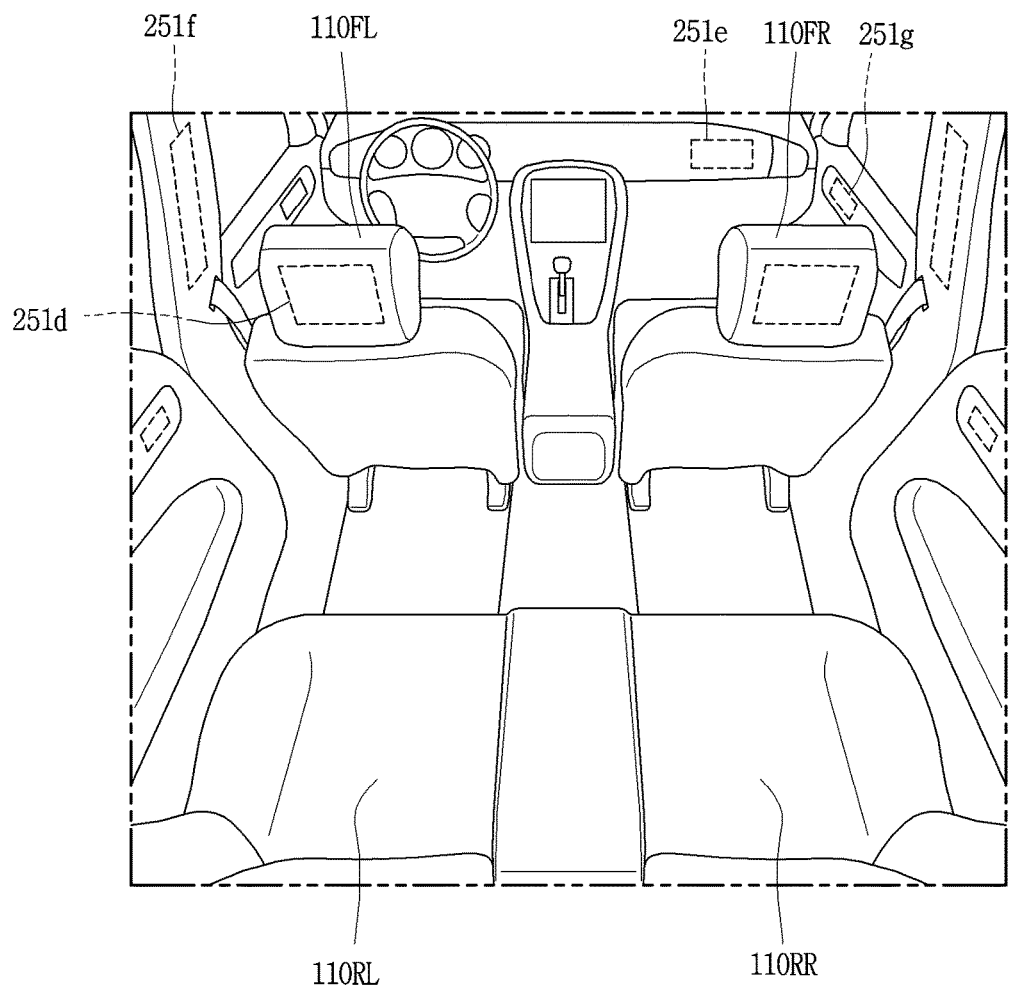

FIGS. 3 and 4 are views illustrating an inside of a vehicle in accordance with an embodiment of the present invention.

Figure 5:
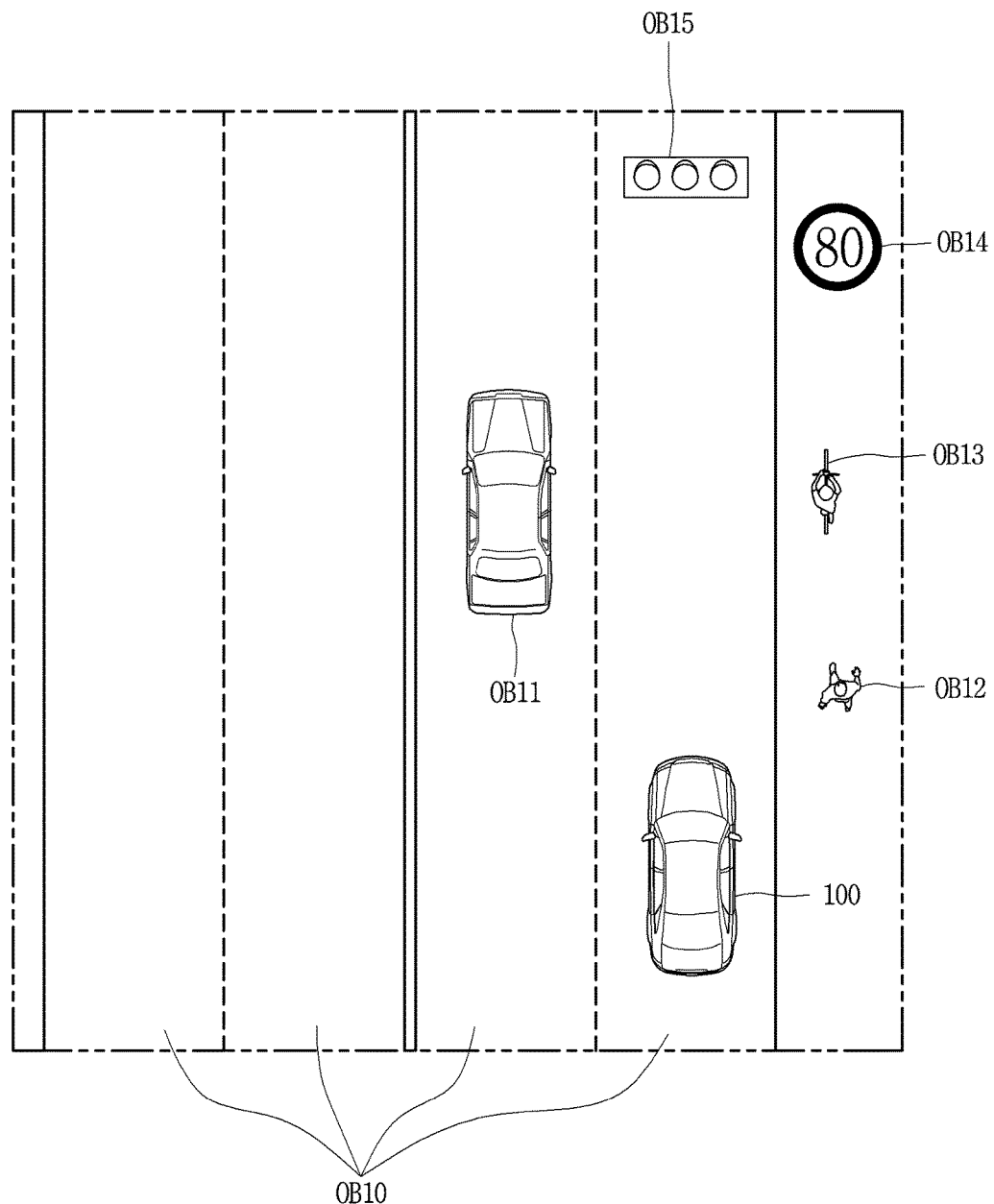
FIGS. 5 and 6 are views referred to explain an object according to an embodiment of the present disclosure.
Figure 6:
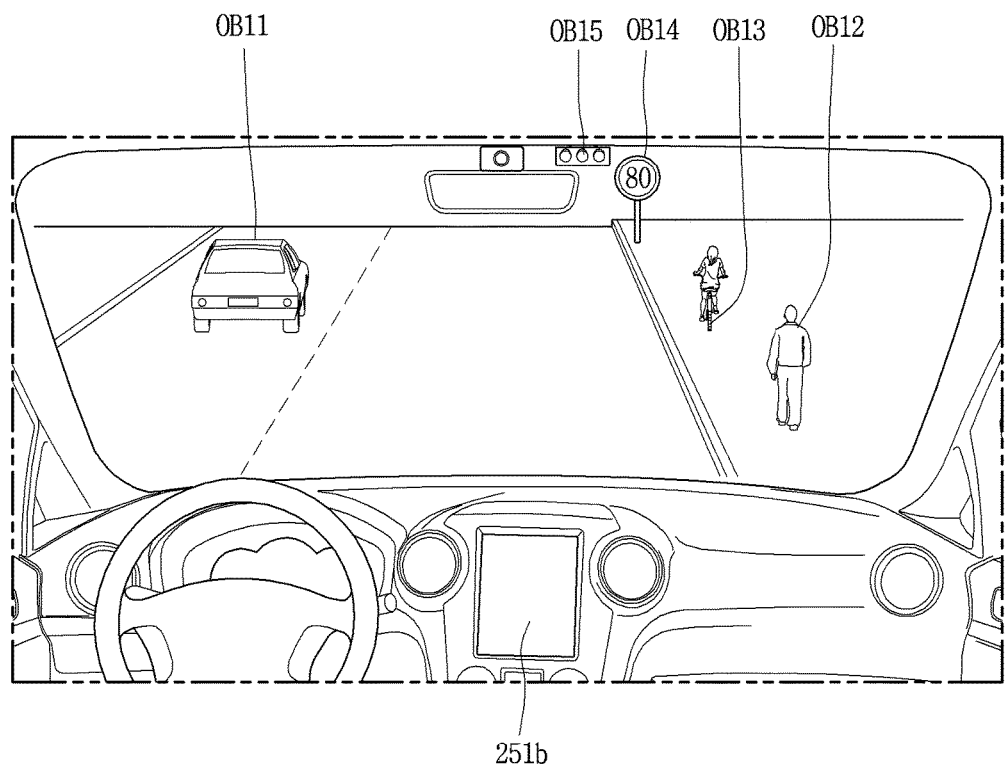

FIGS. 5 and 6 are reference views illustrating objects in accordance with an embodiment of the present invention.

Figure 7:
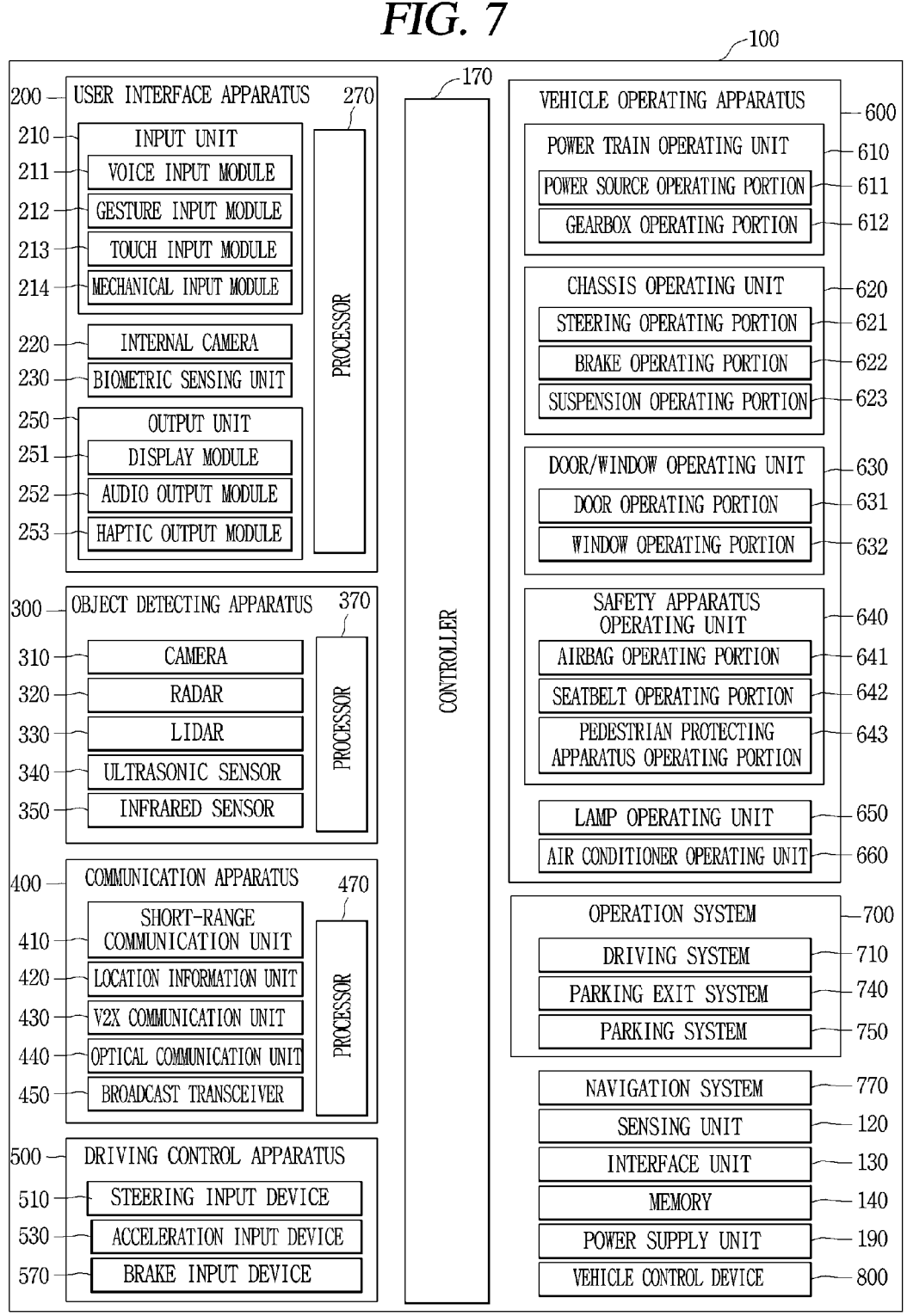
FIG. 7 is a block diagram for explaining a vehicle according to an embodiment of the present disclosure.

FIG. 7 is a block diagram illustrating a vehicle in accordance with an embodiment of the present invention As illustrated in FIG. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a through 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one embodiment of the present invention, with reference to the accompanying drawings.

Hereinafter, a method of autonomously driving a vehicle associated with the present disclosure in an optimized manner or outputting a warning message associated with the driving of the vehicle in an optimized situation will be described in detail with reference to the accompanying drawings.

Figure 8:
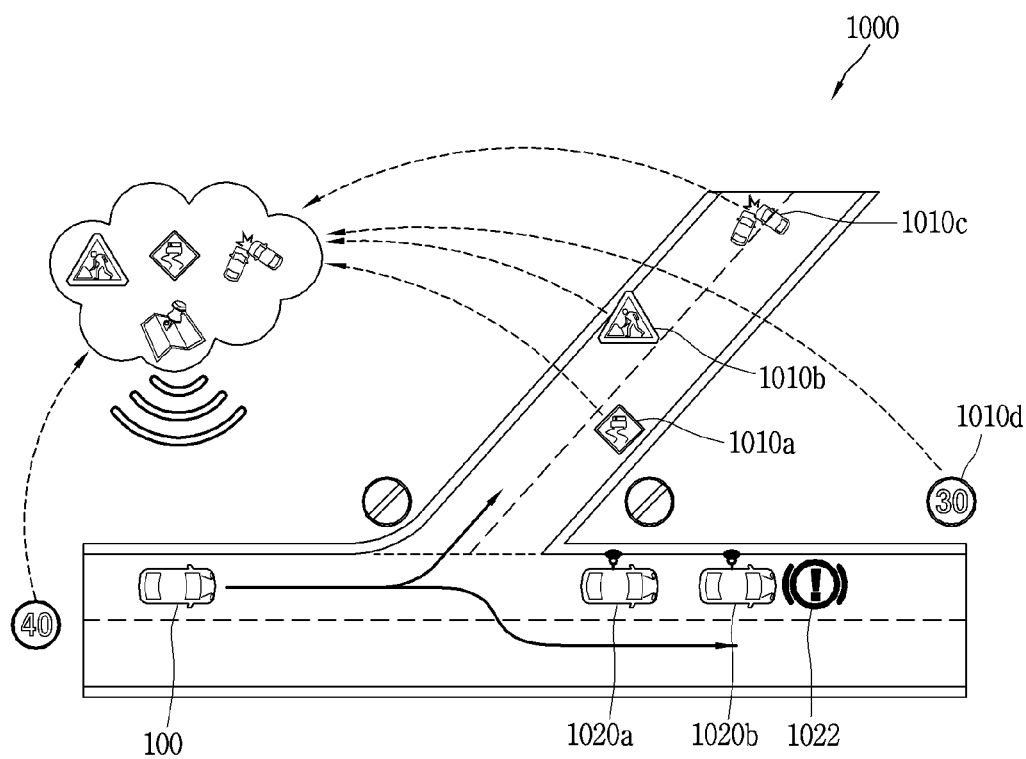
FIG. 8 is a conceptual view for explaining eHorizon associated with the present disclosure.

FIG. 8 is a conceptual view for explaining eHorizon associated with the present disclosure.

Referring to FIG. 8, the vehicle control device 800 associated with the present disclosure may autonomously drive the vehicle 100 based on eHorizon (electronic Horizon).

EHorizon may be classified into categories such as software, system, concept, and the like. EHorizon denotes a configuration in which road shape information on a detailed map in a connected environment such as an external server (cloud), V2X (Vehicle to everything) or the like and real-time events such as real-time traffic signs, road surface conditions, accidents and the like are merged to provide relevant information to autonomous driving systems and infotainment systems.

For an example, eHorizon may refer to an external server (or cloud, cloud server).

In other words, eHorizon may perform the role of transferring a detailed map road shape and real time events in front of the vehicle to autonomous driving systems and infotainment systems under an external server/V2X environment.

In order to transfer eHorizon data (information) transmitted from the eHorizon (i.e., external server) to autonomous driving systems and infotainment systems, a data specification and transmission method may be formed in accordance with a standard called "ADASIS (Advanced Driver Assistance Systems Interface Specification)."

The vehicle control device 800 associated with the present disclosure may use information received from eHorizon for autonomous driving systems and/or infotainment systems.

For example, autonomous navigation systems may be divided into safety aspects and ECO aspects.

In terms of the safety aspect, the vehicle control device 800 according to the present disclosure may perform an ADAS (Advanced Driver Assistance System) function such as LKA (Lane Keeping Assist), TJA (Traffic Jam Assist) or the like, and/or an AD (AutoDrive) function such as advance, road joining, lane change or the like using road shape information and event information received from eHorizon and surrounding object information sensed through the sensing unit 840 provided in the vehicle.

Furthermore, in terms of the ECO aspect, the vehicle control device 800 may receive inclination information, traffic light information, and the like on a front road from eHorizon to control the vehicle so as to achieve efficient engine thrust, thereby enhancing fuel efficiency.

The infotainment system may include convenience aspects.

For an example, the vehicle control device 800 may receive accident information, road surface condition information, and the like on a front road received from eHorizon to output them on a display unit (for example, HUD (Head Up Display), CID, Cluster, etc.) provided in the vehicle to provide guidance information for allowing the driver to perform safe driving.

Referring to FIG. 8, the eHorizon (external server) may receive the location information of various event information (for example, road surface state information 1010a, construction information 1010b, accident information 1010c, etc.) from the vehicle 100 generated from a road and/or road specific speed limit information 1010d from the prevent vehicle 100 or other vehicles 1020a, 1020b or collect them from an infrastructure (for example, a measuring device, a sensing device, a camera, etc.) installed on a road.

Furthermore, the event information and the road specific speed limit information may be linked to map information or may be updated.

In addition, the location information of the event information may be divided into lane units.

Using the information, the eHorizon (external server) of the present disclosure may provide information required for autonomous driving system and infotainment systems to each vehicle based on a detailed map capable of determining a road situation (or road information) in the lane unit.

In other words, the eHorizon (external server) of the present disclosure may provide an absolute highly detailed MAP using an absolute coordinate of information (for example, event information, location information of the present vehicle 100, etc.) associated with a road based on a detailed map.

The information associated with a road provided by the eHorizon may be provided only within a predetermined area (predetermined space) with respect to the vehicle 100.

On the other hand, the vehicle control device of the present disclosure may acquire the location information of another vehicle through communication with the another vehicle. Communication with another vehicle may be accomplished through V2X (Vehicle to everything) communication. Data transmitted/received to/from another vehicle via V2X communication may be data in a format defined by the LDM (Local Dynamic Map) standard.

The LDM denotes a conceptual data storage located in a vehicle control device (or ITS station) including information associated with a safe and normal operation of an application (or application program) provided in a vehicle (or ITS (Intelligent Transport System). The LDM may, for example, comply with EN standards.

The LDM differs from the foregoing ADAS MAP in the data format and transmission method. For an example, the ADAS MAP may correspond to a highly detailed MAP having an absolute coordinate received from the eHorizon (external server), and the LDM may denote a highly detailed MAP having relative coordinates based on data transmitted and received through V2X communication.

The LDM data (or LDM information) denotes data mutually transmitted and received in V2X communication (vehicle to everything) (for example, V2V (Vehicle to Vehicle) communication, V2I (Vehicle to Infra) communication, V2P (Vehicle to Pedestrian) communication).

The LDM is a concept of a storage for storing data transmitted and received in V2X communication, and the LDM may be formed (stored) in a vehicle control device provided in each vehicle.

The LDM data may denote data exchanged with a vehicle and a vehicle (infrastructure, pedestrian) or the like, for an example. The LDM data may include a Basic Safety Message (BSM), a Cooperative Awareness Message (CAM), and a Decentralized Environmental Notification message (DENM), for an example.

The LDM data may be referred to as a V2X message or an LDM message, for an example.

The vehicle control device associated with the present disclosure may efficiently manage LDM data (or V2X messages) efficiently transmitted and received between vehicles using the LDM.

Based on LDM data received via V2X communication, the LDM may store, distribute to another vehicle, and continuously update all relevant information (for example, a location, a speed, a traffic light status, weather information, a road surface condition, and the like of the present vehicle (another vehicle)) on a traffic situation around a place where the vehicle is currently located (or a road situation for an area within a predetermined distance from a place where the vehicle is currently located).

For an example, a V2X application provided in the vehicle control device 800 registers with the LDM, and receives a specific message such as a warning message for all the DENMs including a warning about a failed vehicle. Then, the LDM automatically may assign the received information to the V2X application, and the V2X application may control the vehicle based on the information allocated from the LDM.

As described above, the vehicle of the present disclosure may control the vehicle using the LDM formed by the LDM data collected through V2X communication.

The LDM associated with the present disclosure may provide information associated with a road to the vehicle control device. The information associated with a road provided by the LDM provides only a relative distance and a relative speed with respect to another vehicle (or an event point generated) other than map information having absolute coordinates.

In other words, the vehicle of the present disclosure may construct autonomous driving using an ADAS MAP (absolute coordinate highly-detailed MAP) according to the ADASIS standard provided by eHorizon, but it may be used only to determine a road condition in a surrounding area of the present vehicle.

In addition, the vehicle of the present disclosure may construct autonomous driving using an LDM (relative coordinate highly-detailed MAP) formed by LDM data received through V2X communication, but there is a limitation in that accuracy is inferior due to insufficient absolute location information.

The vehicle control device included in the vehicle of the present disclosure may generate a merged detailed map using an ADAS MAP received from eHorizon and LDM data received through V2X communication, and control (autonomously drive) the vehicle in an optimized manner using the merged detailed map.

Hereinafter, a vehicle control device capable of generating a merged detailed map will be described in more detail with reference to the accompanying drawings.

Figure 9:
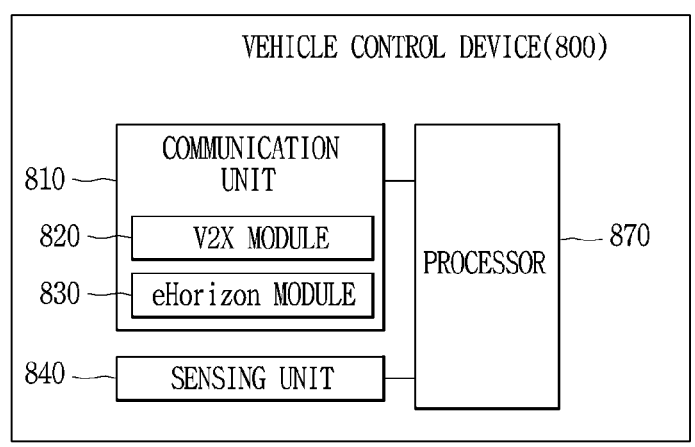
FIG. 9 is a conceptual view for explaining a vehicle control device according to an embodiment of the present disclosure.

FIG. 9 is a conceptual view for explaining a vehicle control device according to an embodiment of the present disclosure. 10A and 10B are conceptual views illustrating an LDM (Local Dynamic Map) and an ADAS (Advanced Driver Assistance System) MAP associated with the present disclosure.

Referring to FIG. 9, the vehicle control device 800 associated with the present disclosure may include a communication unit 810, a sensing unit 840, and a processor 870.

The communication unit 810 may be the communication device 400 described above.

In addition, the communication unit 810 associated with the present disclosure may determine a current location of the vehicle through the location information unit 420. Furthermore, the communication unit 810 may perform communication with a surrounding vehicle (or another vehicle) or perform communication with an external server (eHorizon or cloud server).

In other words, the communication unit 810 associated with the present disclosure may be formed to acquire the location information of the present vehicle, and perform communication with at least one of an external server and another vehicle.

As illustrated in FIG. 9, the communication unit 810 may include a V2X module 820 and an eHorizon module 830.

The V2X module 820 may perform V2X communication with another vehicle. In other words, the communication unit 810 may perform communication with a nearby vehicle (or another vehicle). It can be referred to as V2V (Vehicle to Vehicle) communication. V2V communication may be generally defined as a technology for exchanging information between vehicles, and allow to share nearby vehicle location, speed information, and the like.

Furthermore, the communication unit 810 may perform communication with all devices (for example, mobile terminals, servers, etc.) capable of communicating with each other. It may be defined as vehicle to everything (V2X) communication. V2X communication may be generally defined as a technology for exchanging or sharing information such as traffic situations while communicating with road infrastructures and other vehicles while driving.

V2V communication may be understood as an example of V2X communication or understood as a concept included in V2X communication.

The processor 870 may perform V2V communication or V2X communication with a nearby vehicle (another vehicle) through the communication unit 810.

Here, the nearby vehicle may denote at least one of a vehicle existing within a predetermined distance based on the present vehicle 100 and a vehicle entering within a predetermined distance based on the present vehicle 100.

The present disclosure may not be limited thereto, and the nearby vehicle may include all vehicles capable of performing communication with the communication unit 810 of the present vehicle 100. According to the present specification, for the sake of convenience of explanation, an example will be described in which the nearby vehicle is a vehicle existing within a predetermined distance based on the present vehicle 100 or a vehicle entering within a predetermined distance based on the present vehicle 100.

The predetermined distance may be determined based on a distance that communicable through the communication unit 810 or determined according to the specification of a product or determined/varied based on a user's setting or V2X communication standard.

Specifically, the V2X module 820 may be formed to receive LDM data from another vehicle. The LDM data may be a V2X message (BSM, CAM, DENM, etc.) transmitted and received between vehicles through V2X communication.

The LDM data may include the location information of another vehicle.

The processor 870 may determine a relative location between the present vehicle and another vehicle based on the location information of the present vehicle acquired through the communication unit 810 and the location information of the another vehicle included in LDM data received through the V2X module 820.

In addition, the LDM data may include the speed information of another vehicle. The processor 870 may also determine a relative speed of the another vehicle using the speed information of the present vehicle and the speed information of the another vehicle. The speed information of the present vehicle may be calculated using a degree to which the location information of the vehicle received through the communication unit 810 changes over time or calculated based on information received from the driving operation device 500 or the power train driving unit 610 of the vehicle 100.

The V2X module 820 may be the V2X communication unit 430 described above.

Meanwhile, the communication unit 810 of the present disclosure may include an eHorizon module 830.

The eHorizon module 830 may perform wireless communication with an external server (eHorizon). The eHorizon module 830 may receive an ADAS MAP from the external server.

The ADAS MAP may include map information. In map information included in the ADAS MAP, information associated with a road (event information) may be divided into lane units.

The processor 870 of the vehicle control device 800 associated with the present disclosure may determine an absolute coordinate of the information (event information) associated with a road based on the ADAS MAP received from the external server (eHorizon) through the eHorizon module 830. In addition, the processor 870 may autonomously drive the vehicle or perform vehicle control using the absolute coordinate of the information (event information) associated with the road.

Figure 10A:
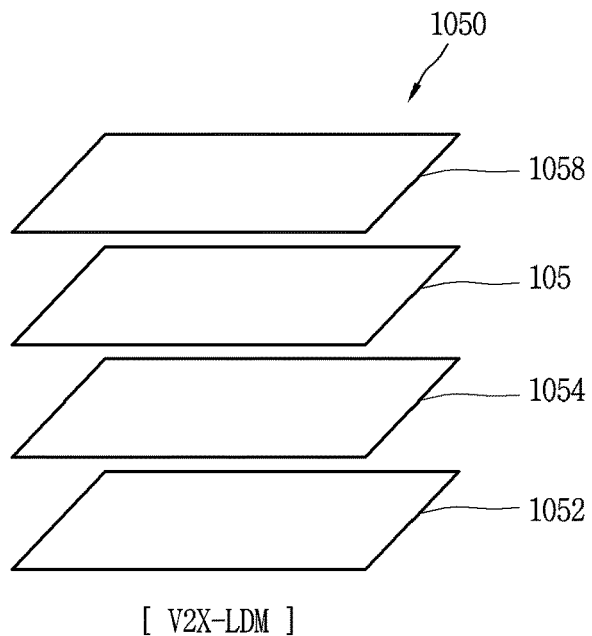
FIGS. 10A and 10B are conceptual views illustrating an LDM (Local Dynamic Map) and an ADAS (Advanced Driver Assistance System) MAP associated with the present disclosure.
Figure 10B:
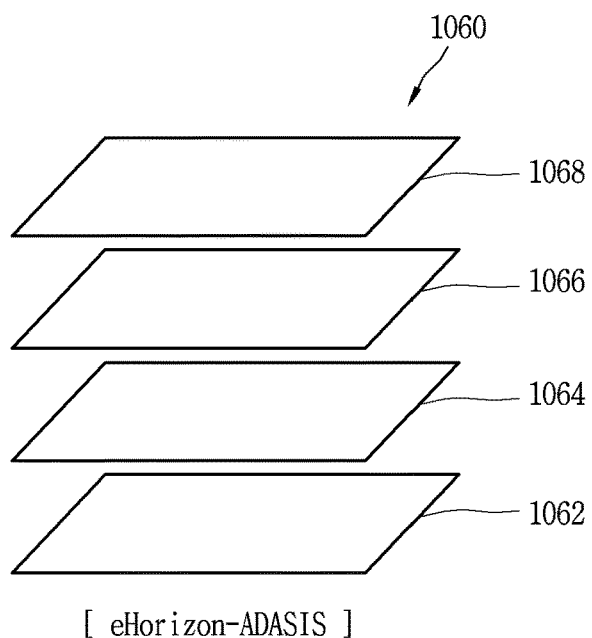

FIG. 10A illustrates an example of a data format of LDM data (or LDM) transmitted and received between vehicles via V2X communication, and FIG. 10B illustrates an example of a data format of an ADAS MAP received from an external server (eHorizon).

First, referring to FIG. 10A, the LDM data (or LDM) 1050 may be formed to have four layers.

The LDM data 1050 may include a first layer 1052, a second layer 1054, a third layer 1056, and a fourth layer 1058.

The first layer 1052 may include static information, for example, map information, among information associated with roads.

The second layer 1054 may include landmark information (for example, specific place information specified by a maker among a plurality of place information included in the map information) among information associated with roads. The landmark information may include location information, name information, size information, and the like.

The third layer 1056 may include traffic situation related information (for example, traffic light information, construction information, accident information, etc.) among information associated with roads. The construction information and the accident information may include location information.

The fourth layer 1058 may include dynamic information (for example, object information, pedestrian information, other vehicle information, etc.) among information associated with roads. The object information, pedestrian information, and other vehicle information may include location information.

In other words, the LDM data 1050 may include information sensed through a sensing unit of another vehicle or information sensed through a sensing unit of the present vehicle, and may include information associated with roads that are transformed in real time as it goes from the first layer to the fourth layer.

Referring to FIG. 10B, the ADAS MAP may be formed to have four layers similar to the LDM data.

The ADAS MAP 1060 may denote data received from eHorizon and formed to conform to the ADASIS standard.

The ADAS MAP 1060 may include a first layer 1062 through a fourth layer 1068.

The first layer 1062 may include topology information. The topology information may be information that explicitly defines a spatial relationship, for an example, and may refer to map information.

The second layer 1064 may include landmark information (for example, specific place information specified by a maker among a plurality of place information included in the map information) among information associated with the road. The landmark information may include location information, name information, size information, and the like.

The third layer 1066 may include highly detailed map information. The highly detailed MAP information may be referred to as an HD-MAP, and information associated with roads (for example, traffic light information, construction information, accident information) may be recorded in the lane unit. The construction information and the accident information and the like may include location information.

The fourth layer 1068 may include dynamic information (for example, object information, pedestrian information, other vehicle information, etc.). The object information, pedestrian information, other vehicle information and the like may include location information.

In other words, the ADAS MAP 1060 may include information associated with roads that are transformed in real time as it goes from the first layer to the fourth layer, similarly to the LDM data 1050.

The vehicle control device 800 associated with the present disclosure may include a sensing unit 840.

The sensing unit 840 may be the object detecting apparatus 300 described in FIG. 7 or the sensing unit 120 provided in the vehicle 100.

In addition, the sensing unit 840 may be an independent sensing unit, or the sensing unit 120 provided in the vehicle 100 may be an independently separated sensing unit. The sensing unit 840 may include the characteristics of the sensing unit 120 or the object device 300 described in FIG. 7 even when the sensing unit 840 is an independent sensing unit.

The sensing unit 820 may include the camera 310 described in FIG. 7.

Furthermore, the sensing unit 840 may be implemented in combination with at least two of a camera 310, a radar 320, a lidar 330, an ultrasonic sensor 340, an infrared sensor 350, and a sensing unit 350.

The sensing unit 840 may sense an object existing in the vicinity of the vehicle 100 and sense information associated with the object.

For example, the object may include the above-mentioned nearby vehicle, nearby person, surrounding object, surrounding terrain, and the like.

The sensing unit 820 may sense information associated with the vehicle 100 of the present disclosure.

The information associated with the vehicle may be at least one of vehicle information (or a driving state of the vehicle) and the surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user gets on the vehicle, and information associated with the user (for example, whether or not the user is an authenticated user), and the like.

The surrounding information of the vehicle may be a state of road surface on which the vehicle is travelling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, for the sake of convenience of explanation, a configuration in which the sensing unit 820 is additionally provided in the vehicle control device 800 will be described as an example. Allowing the processor 870 to acquire any information through the sensing unit 820 may be understood as allowing the processor 870 to acquire any information using at least one of the object detecting apparatus 300 and the sensing unit 120 provided in the vehicle 100.

The vehicle control apparatus 800 of the present disclosure may include a processor 870 capable of controlling a communication unit 810, a V2X module 820, an eHorizon module 830, a sensing unit 840, and the like.

The processor 870 may be the controller 170 described in FIG. 7.

The processor 870 may control the components described in FIG. 7 and the components described in FIG. 8.

The processor 870 may autonomously drive the vehicle 100.

For example, the processor 870 may autonomously drive the vehicle 100 based on information sensed through the sensing unit 840 and information received through the communication unit 810.

The technology for autonomously driving a vehicle is a general technology, and thus more detailed description thereof will be omitted.

Specifically, the processor 870 may control the communication unit 810 to acquire the location information of the vehicle. For example, the processor 870 may acquire the location information (location coordinates) of the present vehicle 100 through the location information unit 420 of the communication unit 810.

Furthermore, the processor 870 may control the eHorizon module 830 of the communication unit 810 to receive map information from an external server. Here, the eHorizon module 830 may receive an ADAS MAP from the external server (eHorizon). The map information may be included in the ADAS MAP.

In addition, the processor 870 may control the V2X module 820 of the communication unit 810 to receive the location information of another vehicle from the another vehicle. Here, the V2X module 820 may receive LDM data from another vehicle. The location information of the another vehicle may be included in the LDM data.

The another vehicle denotes a vehicle existing within a predetermined distance from the vehicle, and the predetermined distance may be a communication available distance of the communication unit 810 or a distance set by a user.

The processor 870 may control the communication unit to receive map information from an external server and the location information of another vehicle from the another vehicle.

Furthermore, the processor 870 may merge the acquired vehicle location information of the vehicle and the received location information of the another vehicle into the received map information, and control the vehicle 100 based on at least one of the merged map information and information associated with the vehicle sensed through the sensing unit 840.

Here, map information received from the external server may denote highly detailed map information (HD-MAP) included in the ADAS MAP. The highly detailed map information may be recorded with information associated with road in the lane unit.

The processor 870 may merge the location information of the present vehicle 100 and the location information of another vehicle into the map information in the lane unit. In addition, the processor 870 may merge information associated with roads received from an external server and information associated with roads received from another vehicle into the map information in the lane unit.

The processor 870 may generate an ADAS MAP required for the control of the vehicle using an ADAS MAP received from an external server and information associated with the vehicle received through the sensing unit 840.

Specifically, the processor 870 may apply information associated with the vehicle sensed within a predetermined range through the sensing unit 840 to map information received from the external server.

Here, the predetermined range may be an available distance allowing the sensing unit 840 to sense information or may be a distance set by a user.

The processor 870 may apply information associated with a vehicle sensed within a predetermined range through the sensing unit to the map information and then additionally merge the location information of another vehicle thereto to control the vehicle.

In other words, when information associated with a vehicle sensed within a predetermined range through the sensing unit is applied to map information, the processor 870 may use only the information within the predetermined range from the vehicle, and thus a range capable of controlling the vehicle may be local.

However, the location information of another vehicle received through the V2X module may be received from the another vehicle existing in a space out of the predetermined range. It may be because the communication available distance of the V2X module communicating with the another vehicle through the V2X module is farther than a predetermined range of the sensing unit 840."

As a result, the processor 870 may merge the location information of another vehicle included in LDM data received through the V2X module 820 into map information that has sensed information associated with the vehicle to acquire the location information of the vehicle existing in a broader range, thereby more effectively controlling the vehicle.

For example, it is assumed that a plurality of other vehicles are crowded ahead in a lane in which the vehicle exists, and it is assumed that the sensing unit is able to sense only the location information of an immediately preceding vehicle.

In this case, when only information associated with a vehicle sensed within a predetermined range on map information is used, the processor 870 may generate a control command for controlling the vehicle such that the vehicle overtakes the preceding vehicle.

However, in reality, a plurality of other vehicles are crowded ahead, and the vehicle may be in a situation where it is not easy to pass and cut in.

At this time, the present disclosure may acquire the location information of another vehicle received through the V2X module. At this time, the received location information of the another vehicle may acquire the location information of not only a vehicle immediately in front of the present vehicle 100 but also a plurality of other vehicles in front of the preceding vehicle.

The processor 870 may additionally merge the location information of a plurality of other vehicles acquired through the V2X module to map information to which information associated with the vehicle is applied to determine that it is in an inappropriate situation to pass and cut in the preceding vehicle.

Through the foregoing configuration, the present disclosure may overcome the conventional technical limitations in which only information associated with the vehicle acquired through the sensing unit 840 is merely merged to highly detailed map information to allow autonomous driving only within a predetermined range. In other words, according to the present disclosure, not only information associated with a vehicle sensed through the sensing unit but also information (a speed of another vehicle, a location of another vehicle) associated with another vehicle received from the another vehicle at a greater distance than the predetermined range through the V2X module, thereby more accurately and stably performing vehicle control.

Vehicle control described in this specification may include at least one of autonomously driving the vehicle 100 and outputting a warning message associated with the driving of the vehicle.

Hereinafter, a method of allowing the processor to control a vehicle using information associated with the vehicle sensed through LDM data received through the V2X module, an ADAS MAP received from the external server (eHorizon) and information associated with the vehicle sensed through the sensing unit provided in the vehicle will be described in detail with reference to the accompanying drawings.

Figure 11A:
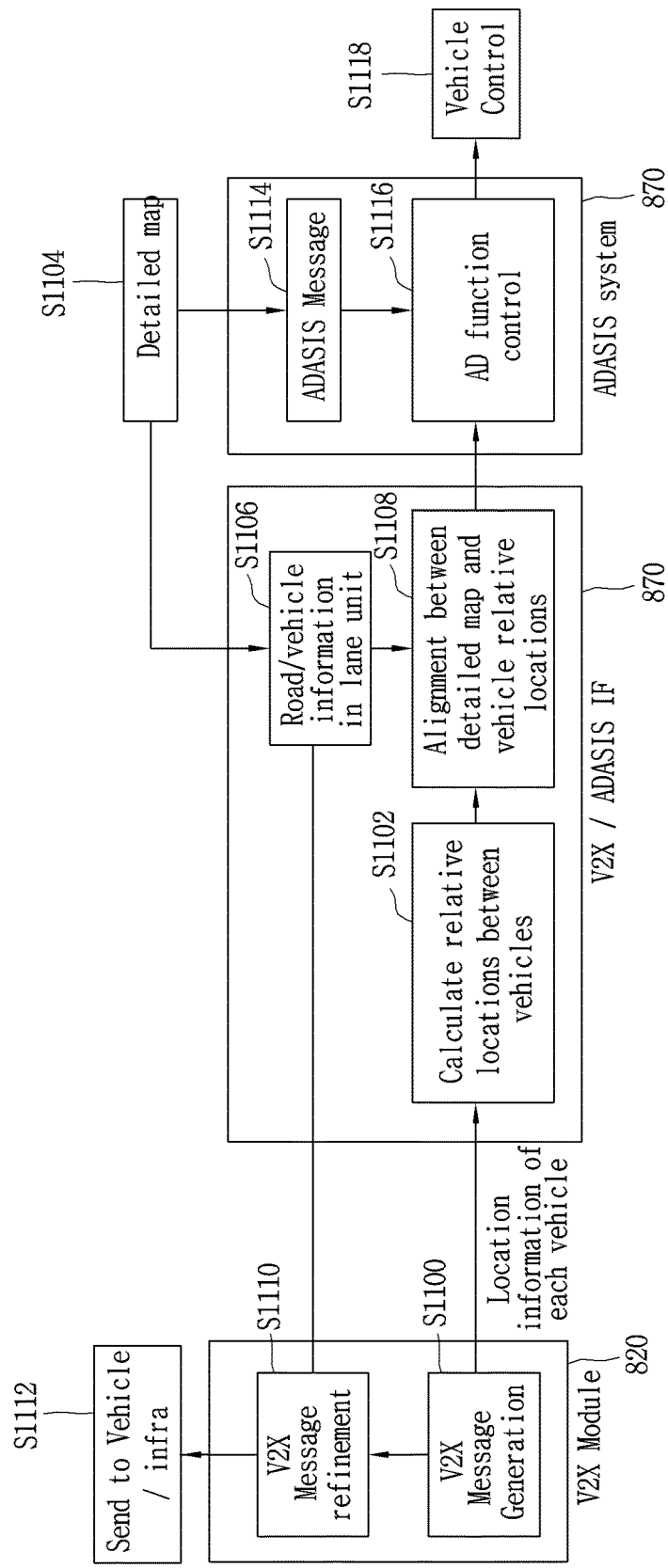
FIGS. 11A and 11B are conceptual views illustrating a method of controlling a vehicle using an LDM and an ADAS MAP associated with the present disclosure.
Figure 11B:
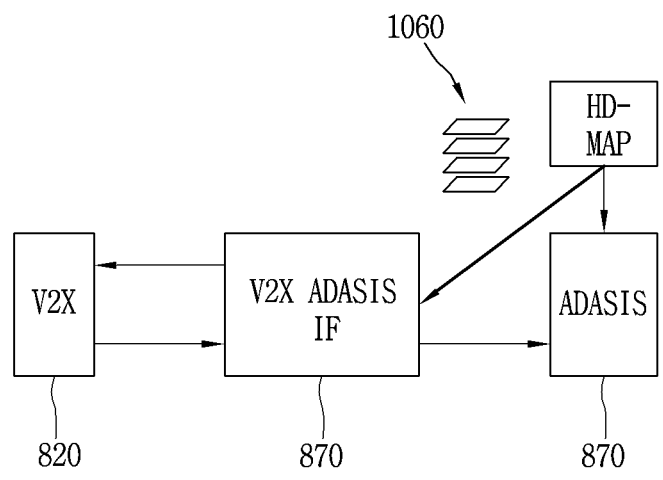
Figure 11B:
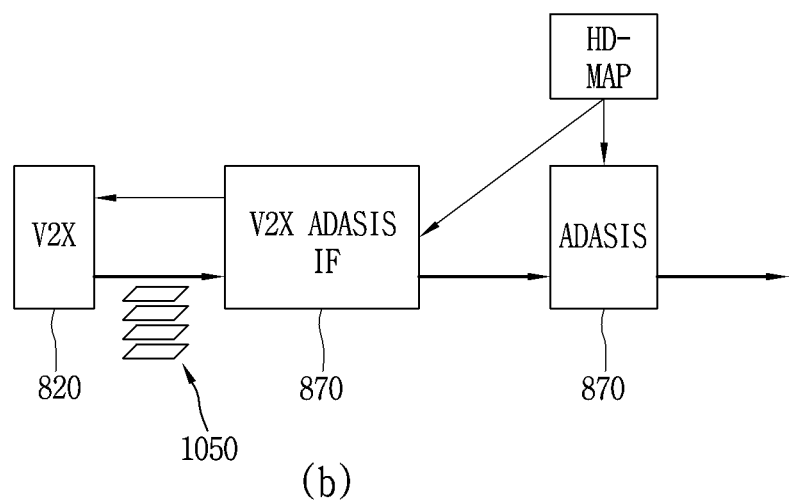

FIGS. 11A and 11B are conceptual views illustrating a method of controlling a vehicle using an LDM and an ADAS MAP associated with the present disclosure.

First, referring to FIG. 11A, the processor 870 included in the vehicle control device 800 of the present disclosure may include a V2X/ADASIS IF (InterFace) and an ADASIS system. The V2X/ADASIS IF and ADASIS system may be in a hardware configuration or in the form of a distinctive component according to the function in terms of software.

The V2X module 820 of the communication unit 810 may generate a V2X message (S1100). Here, the V2X message may include LDM data.

For an example, the V2X module 820 may generate the V2X message based on the receipt of a V2X message transmission request from an infrastructure installed in another vehicle or on a road.

For another example, the V2X module 820 may generate the V2X message to request the location information of another vehicle to the another vehicle. Here, the processor 870 may transmit the V2X message to another vehicle, and receive the location information of another vehicle from the another vehicle.

At this time, the another vehicle to which the V2X message is transmitted may be another vehicle existing within a predetermined distance from the present vehicle 100. The predetermined distance may be determined by an available distance of the V2X module or the setting of a user. When a number of other vehicles to which the V2X message is transmitted is plural, the processor 870 may acquire the location information of the another vehicle from at least one of the plurality of other vehicles through the V2X module 820.

Then, the processor 870 (V2X/ADASIS IF) may calculate a relative location (relative distance) between the present vehicle and the another vehicle based on the received location information of the another vehicle (S1104).

In addition, the processor 870 may receive an ADAS MAP from the external server (eHorizon) through the eHorizon module 830 (S1104). The ADAS MAP may include a detailed map capable of receiving map information, namely, information associated with a road in the lane unit.

The processor 870 may determine information (vehicle information) associated with roads in the lane unit from the received map information (S1106).

Then, the processor 870 may align a relative location between the present vehicle and the another vehicle to the received map information (S1108).

In other words, the processor 870 may extract a relative location between the vehicle and another vehicle that has transmitted LDM data based on the LDM data received through the V2X module 820, and align the extracted relative location of the another vehicle to an ADAS MAP (map information) received through the eHorizon module 830.

In other words, the present disclosure may align a relative location between the present vehicle and the another vehicle extracted through V2X communication to a detailed map (ADAS MAP received from the external server (eHorizon)) capable of merging information in the lane unit to generate a merged map capable of determining a real-time relative location between the present vehicle and the another vehicle in the lane unit.

The V2X module 820 may redefine a V2X message using the ADAS MAP in which the relative location between the present vehicle and the another vehicle is aligned in lane units (S1110). Then, the processor 870 may transmit the redefined V2X message to the another vehicle or infrastructure.

In addition, the processor 870 may generate an ADASIS standard message using the ADAS MAP received from the external server (eHorizon) (S1114). The message may be a message used for autonomous driving of the vehicle. For example, the message may include a warning message generated during autonomous driving, a notification message for notifying information associated with roads such as accident information/construction information, and the like.

The processor 870 may transmit an ADAS MAP (map information, highly detailed MAP) in which a relative location between the present vehicle and the another vehicle is aligned in the lane unit to an ADASIS system (S1108). Then, the processor 870 may perform an AD function (autonomous driving) using the ADASIS standard message and the ADAS MAP (map information, highly detailed MAP) in which the relative location between the present vehicle and the another vehicle is aligned in the lane unit (S1118).

With this configuration, the processor 870 of the present disclosure can control the vehicle using the ADAS MAP (map information, highly detailed MAP) in which the relative location between the present vehicle and the another vehicle is aligned in the lane unit (S1118).

In other words, the present disclosure may calculate a relative location between the present vehicle and another vehicle using the location information of the another vehicle received from the another vehicle through V2X communication. Then, the calculated relative location information may be aligned in the lane unit on a highly detailed MAP received from the external server (eHorizon).

The ADASIS system may enhance the accuracy of autonomous driving (AD) functions using an ADAS MAP in which a relative location between the present vehicle and the another vehicle is aligned in the lane unit and thus used for autonomous driving control by improving.

In addition, the V2X module may enhance the accuracy of outputting a warning message associated with the driving of a vehicle using a highly detailed MAP capable of recording information associated with roads in the lane unit.

Meanwhile, the LDM data and the ADAS MAP of the present disclosure may use different coordinates. In this case, as illustrated in FIG. 11B, the processor 870 may convert a coordinate system of an ADAS MAP 1060 received via the eHorizon module 830 into a coordinate system of LDM data received via the V2X module 820 or convert a coordinate system of the LDM data 1050 into a coordinate system of the ADAS MAP.

The types of coordinate systems may include various types of coordinate systems such as a longitude/latitude coordinate system, a Cartesian coordinate system, a polar coordinate system, and the like, and the processor 870 may perform coordinate system conversion such that a coordinate system of the LDM data received through the V2X module corresponds to a coordinate system of the ADAS MAP received through the eHorizon module.

Through this, the processor 870 of the present disclosure may merge (align) the location information of other vehicles included in the LDM data to the ADAS MAP in the lane unit.

Hereinafter, a method of controlling a vehicle using an ADAS MAP in which a relative location between the present vehicle and another vehicle is aligned in the lane unit will be described in more detail with reference to the accompanying drawings.

FIGS. 12A, 12B, 13A, 13B, 13C, 13D and 13E are conceptual views for explaining a situation of outputting a warning message associated with the driving of a vehicle according to an embodiment of the present disclosure and an autonomous driving method of the vehicle.

The processor 870 of the present disclosure may control the autonomous driving of the vehicle based on an ADAS MAP in which a relative location of another vehicle is aligned in the lane unit.

Furthermore, the processor 870 of the present disclosure may determine whether or not to output a warning message associated with the driving of the vehicle based on the ADAS MAP in which the relative location of the another vehicle is aligned in the lane unit.

Specifically, the processor 870 may output a warning message associated with the driving of the vehicle when the relative location with respect to the another vehicle is less than a preset distance.

On the other hand, the processor 870 may not output a warning message associated with the driving of the vehicle when it is determined that the another vehicle located within the preset distance and the present vehicle 100 are traveling in different lanes based on the ADAS MAP aligned in the lane unit.

Figure 12A:
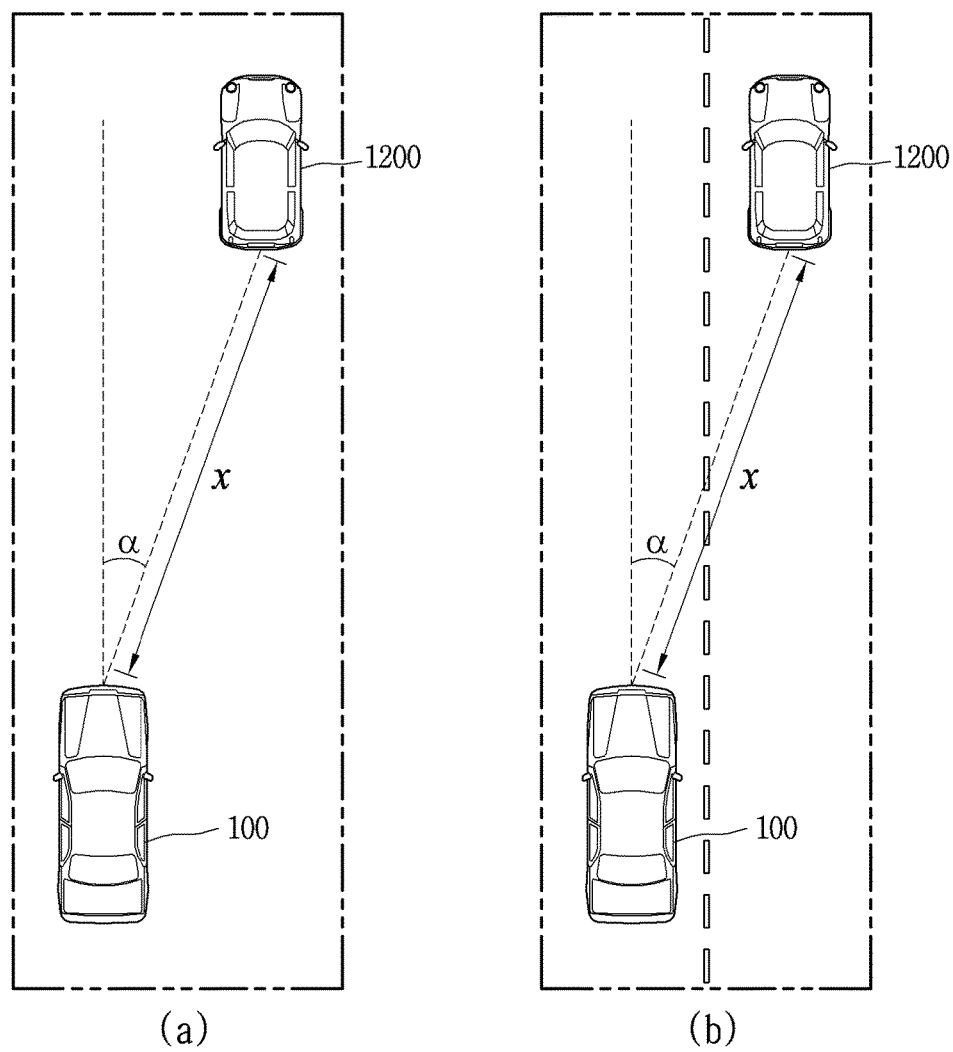
FIGS. 12A, 12B, 13A, 13B, 13C, 13D and 13E are conceptual views for explaining a situation of outputting a warning message associated with the driving of a vehicle according to an embodiment of the present disclosure and an autonomous driving method of the vehicle.

For example, as illustrated in FIG. 12A(a), the processor 870 may calculate a relative location (relative distance (x)) and angel (α)) between the present vehicle 100 and the another vehicle 1200 based on the LDM data received via V2X communication.

When only the LDM data received via the V2X communication is used, the processor 870 may output a warning message (for example, FCW (Forward Collision Warning)) associated with the driving of the vehicle when a relative location (relative distance (x)) between the present vehicle 100 and the another vehicle 1200 is less than a preset distance.

Moreover, the processor 870 of the present disclosure may determine whether not to output a warning message associated with the driving of the vehicle based on an ADAS MAP (map information) in which a relative location between the present vehicle 100 and the another vehicle 1200 is aligned in the lane unit as illustrated in FIG. 12A(b).

For example, as illustrated in FIG. 12A(b), even though a relative location (relative distance (x)) between the present vehicle 100 and the another vehicle 1200 is less than a preset distance, the processor 870 of the present disclosure may not output a warning message associated with the driving of the vehicle when it is determined that the present vehicle 100 and the another vehicle 1200 are traveling in different lanes based on the aligned ADAS MAP.

In other words, the present disclosure may align a relative location between the present vehicle and another vehicle in the lane unit to a detailed management program, thereby remarkably enhancing the accuracy of a situation of outputting a warning message associated with the driving of the vehicle.

Figure 12B:
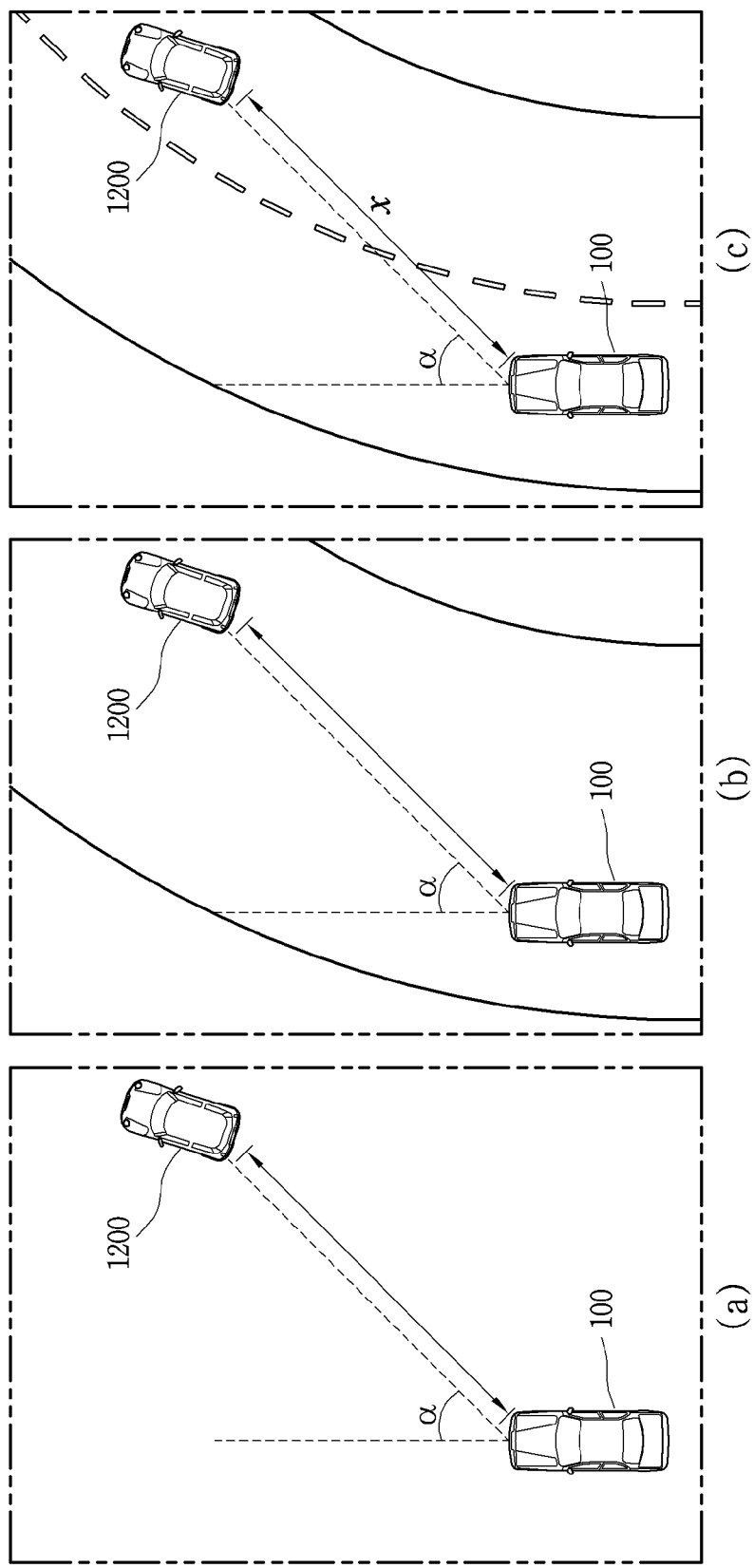

For another example, as illustrated in FIG. 12B(a), in case where only LDM data received through V2X communication is used, the processor 870 may not output a warning message associated with the driving of the vehicle when a relative angle (a) between the present vehicle 100 and the another vehicle 1200 Is greater than a preset angle.

However, as illustrated in (b) of FIG. 12B(b), when a relative location between the present vehicle 100 and the another vehicle 1200 corresponds to a curved road using prestored map information, the processor 870 may output a warning message associated with the driving of the vehicle even though the relative angle between the present vehicle 100 and the another vehicle 1200 is greater than a preset angle.

Moreover, as illustrated in FIG. 12B(c), the processor 870 of the present disclosure may align a relative location between the present vehicle 100 and the another vehicle 1200 in the lane unit to an ADAS MAP received from an external server via the eHorizon module. In this case, the processor 870 may not output a warning message associated with the driving of the vehicle when it is determined that the present vehicle 100 and the another vehicle 1200 are traveling in different lanes even though a relative angle (a) between the present vehicle 100 and the another vehicle 1200 is greater than a preset angle and the present vehicle 100 and the another vehicle 1200 are traveling on a curved road.

On the contrary, the processor 870 may output a warning message associated with the vehicle when it is determined that the present vehicle 100 and the another vehicle 1200 are traveling in the same lane based on the aligned ADAS MAP even though a relative distance between the present vehicle 100 and the another vehicle 1200 is less than a preset distance or a relative angle between the present vehicle 100 and the another vehicle 1200 is greater than a preset angle while traveling on a curved road.

As described above, according to the present disclosure, it may be possible to merge a relative location between the present vehicle and another vehicle extracted using LDM data received through V2X communication and a highly detailed ADAS MAP received from an external server to determine whether or not the present vehicle and the another vehicle are traveling in the same lane. Furthermore, the present disclosure may determine whether or not to output a warning message associated with the driving of the vehicle based on whether the present vehicle and another vehicle are traveling in the same lane or in different lanes, thereby remarkably enhancing the accuracy of the message.

FIGS. 12A and 12B illustrate an example in which a relative location of the present vehicle and the another vehicle is merged to an ADAS MAP (map information) in the lane unit to determine whether or not to output a warning message associated with the driving of the vehicle, but the present disclosure is not limited thereto. The contents described in FIGS. 12A and 12B may be used to autonomously drive the vehicle 100 with an ADAS MAP (map information) to which a relative location of the present vehicle and another vehicle is merged in the lane unit.

FIGS. 13A through 13E are views illustrating situations (or situations in which an ADAS function is carried out) in which various kinds of warning messages associated with the driving of vehicle are output.

Hereinafter, a method of outputting a warning message using an ADAS MAP in which a relative location of the vehicle and another vehicle extracted through V2X communication is merged into highly detailed map information received from an external server in the lane unit will be described in more detail with reference to the accompanying drawings.

Figure 13A:
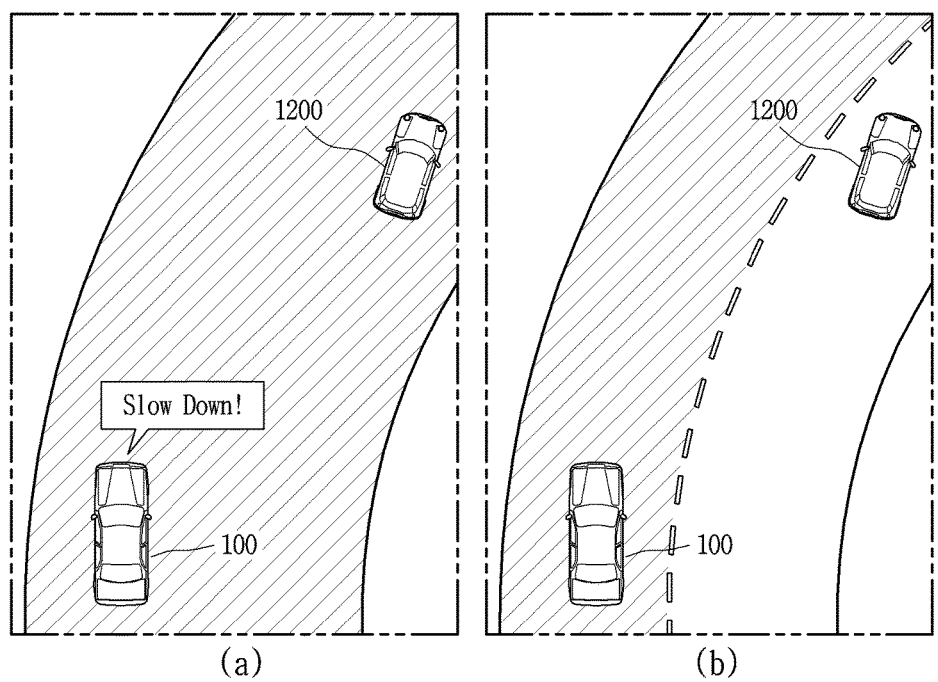

FIG. 13A illustrates a situation for a forward collision warning (FCW) among warning messages associated with the driving of the vehicle.

As illustrated in FIG. 13A(a), in case where only a relative location between the present vehicle 100 and the another vehicle 1200 extracted through V2X communication is merely used, an FCW may be out when the relative location (relative distance) is less than a predetermined distance.

However, as illustrated in FIG. 13A(b), in case where an ADAS MAP in which a relative location of the present vehicle 100 and another vehicle 1200 extracted through V2X communication is merged into highly detailed map information received from an external server in the lane unit is used, the processor 870 may not output an FCW when the present vehicle 100 and the another vehicle 1200 are traveling in different lanes.

Through this, the present disclosure may enhance the accuracy of a warning message output using map information to which a relative location of the present vehicle and the another vehicle are merged in the lane unit.

Figure 13B:
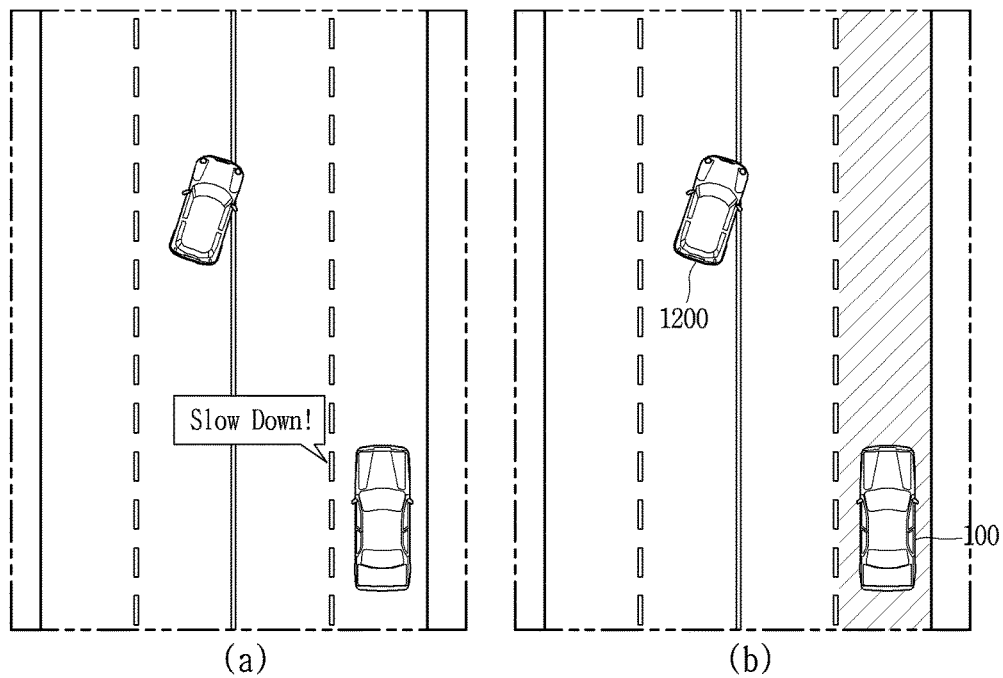

FIG. 13B illustrates a situation for an LCW (Lane Change Warning) among warning messages associated with the driving of the vehicle.

As illustrated in FIG. 13B(a), in case where only a relative location between the present vehicle 100 and the another vehicle 1200 extracted through V2X communication is merely used, an LCW may be output when the present vehicle attempts a lane change in a state that the relative location (relative distance) is less than a predetermined distance.

However, as illustrated in FIG. 13B(b), in case where an ADAS MAP in which a relative location of the present vehicle 100 and another vehicle 1200 extracted through V2X communication is merged into highly detailed map information received from an external server in the lane unit is used, the processor 870 may output an LCW when the present vehicle 100 and the another vehicle 1200 are respectively traveling in two adjacent lanes in a state that the relative distance between the present vehicle and the another vehicle is less than a predetermined distance. If the present vehicle 100 and the another vehicle 1200 are traveling in the same lane while the relative distance is less at a predetermined distance or there exist one or more lanes between the lane in which the present vehicle is traveling and the lane in which the another vehicle is traveling (i.e., when they are not respectively traveling in two adjacent lanes), then the processor 870 may not output an LOW.

Figure 13C:
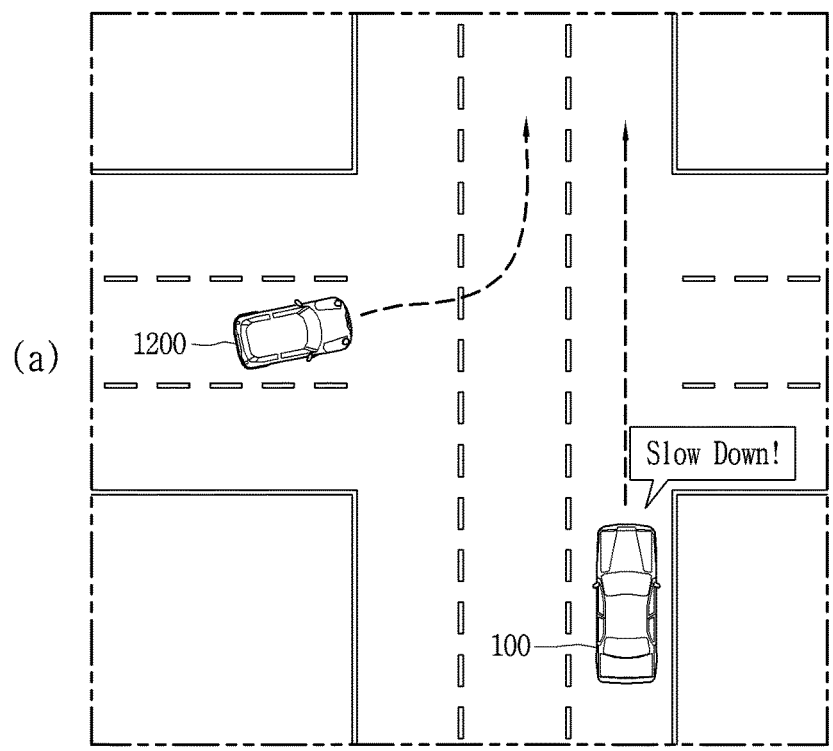
Figure 13C:
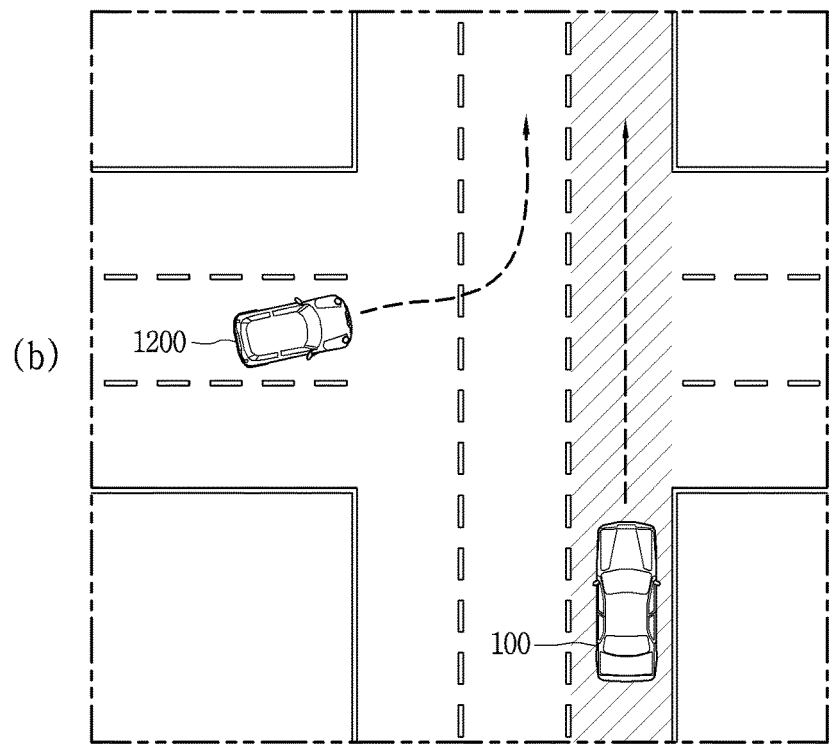

FIG. 13C illustrates a situation for a Turn Assist Warning (TAW) among warning messages associated with the driving of the vehicle.

As illustrated in FIG. 13C(a), in case where only a relative location between the present vehicle 100 and the another vehicle 1200 extracted through V2X communication is merely used, a TAW may be output when the relative location (relative distance) is less than a predetermined distance after entering an intersection.

However, as illustrated in FIG. 13C(b), when traveling route information received from another vehicle via V2X communication is merged to a highly detailed MAP information received from an external server in the lane unit, the processor 870 may determine an entry lane of another vehicle on the basis of the traveling route information, and may not output a TAW when the entry lane of the another vehicle is different from the entry lane of the present vehicle.

Figure 13D:
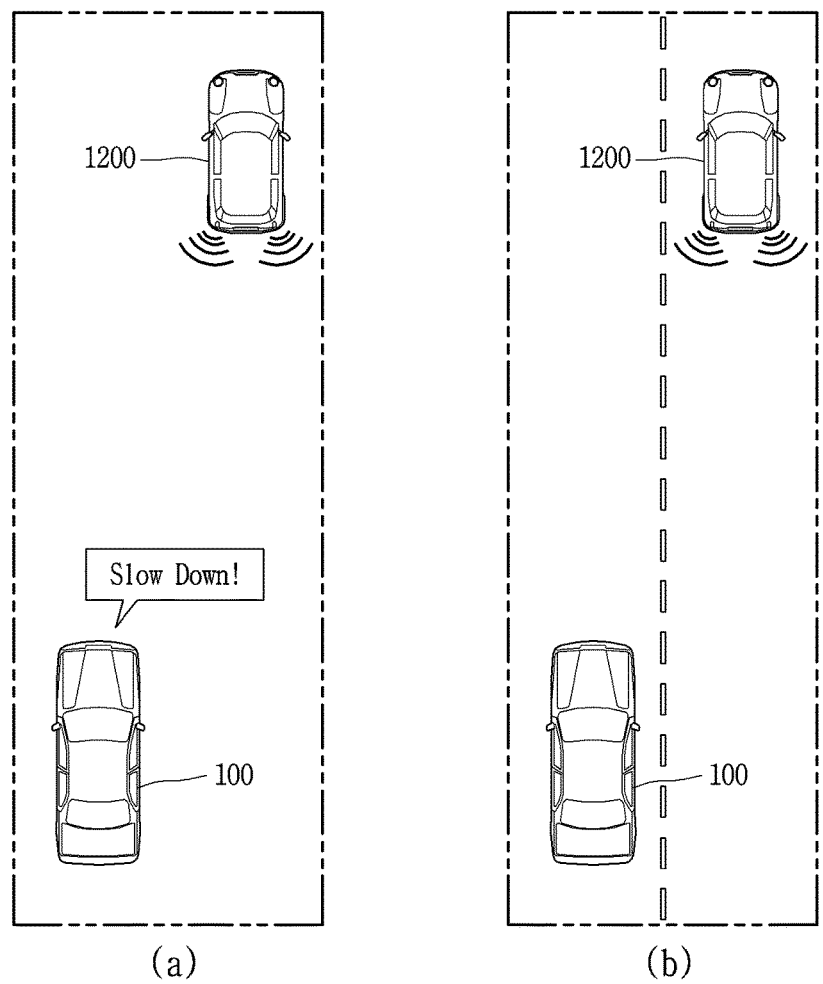

FIG. 13D illustrates a situation for Emergency Electronic Brake Light (EEBL) among warning messages associated with driving of the vehicle.

As illustrated in FIG. 13D(a), when EEBL is sensed from the preceding vehicle 1200 via V2X communication, the present vehicle 100 may reduce a speed of the vehicle or output a warning message that EEBL has been sensed in response to the EEBL.

However, as illustrated in FIG. 13D(b), in case where an ADAS MAP in which a relative location of the present vehicle 100 and another vehicle 1200 extracted through V2X communication is merged into highly detailed map information received from an external server in the lane unit is used, the processor 870 may reduce only a speed of the vehicle or output only a warning message that has sensed EEBL or may not perform both of them even when it is determined that the present vehicle 100 and the another vehicle 1200 are traveling in different lanes.

Figure 13E:
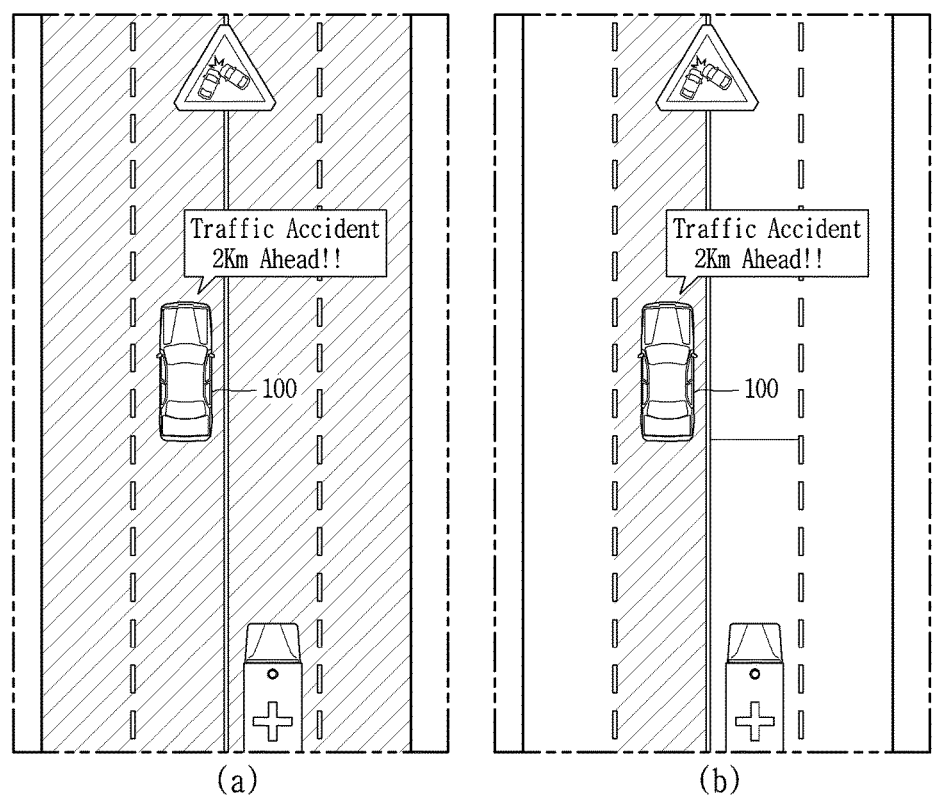

FIG. 13E illustrates a situation for EVA (Emergency Vehicle Approaching) among warning messages associated with the driving of the vehicle.

When it is sensed that an emergency vehicle (for example, a vehicle that sounds a siren) is approaching from the front or rear side only via V2X communication as illustrated in FIG. 13E(a), the present vehicle 100 may output a warning message or change a traveling route to allow the emergency vehicle to pass.

However, as illustrated in FIG. 13E(b), in case where an ADAS MAP in which a relative location of the present vehicle 100 and another vehicle 1200 extracted through V2X communication is merged into highly detailed map information received from an external server in the lane unit is used, the processor 870 may merely output only a warning message or maintain the autonomous driving of the vehicle without additional control of any other vehicle when it is determined that the present vehicle and the emergency vehicle are traveling in different lanes.

Through this, the present disclosure may output more optimized and accurate warning messages for various situations using map information in which a relative location between the present vehicle and the another vehicle are merged in the lane unit.

Figure 14:
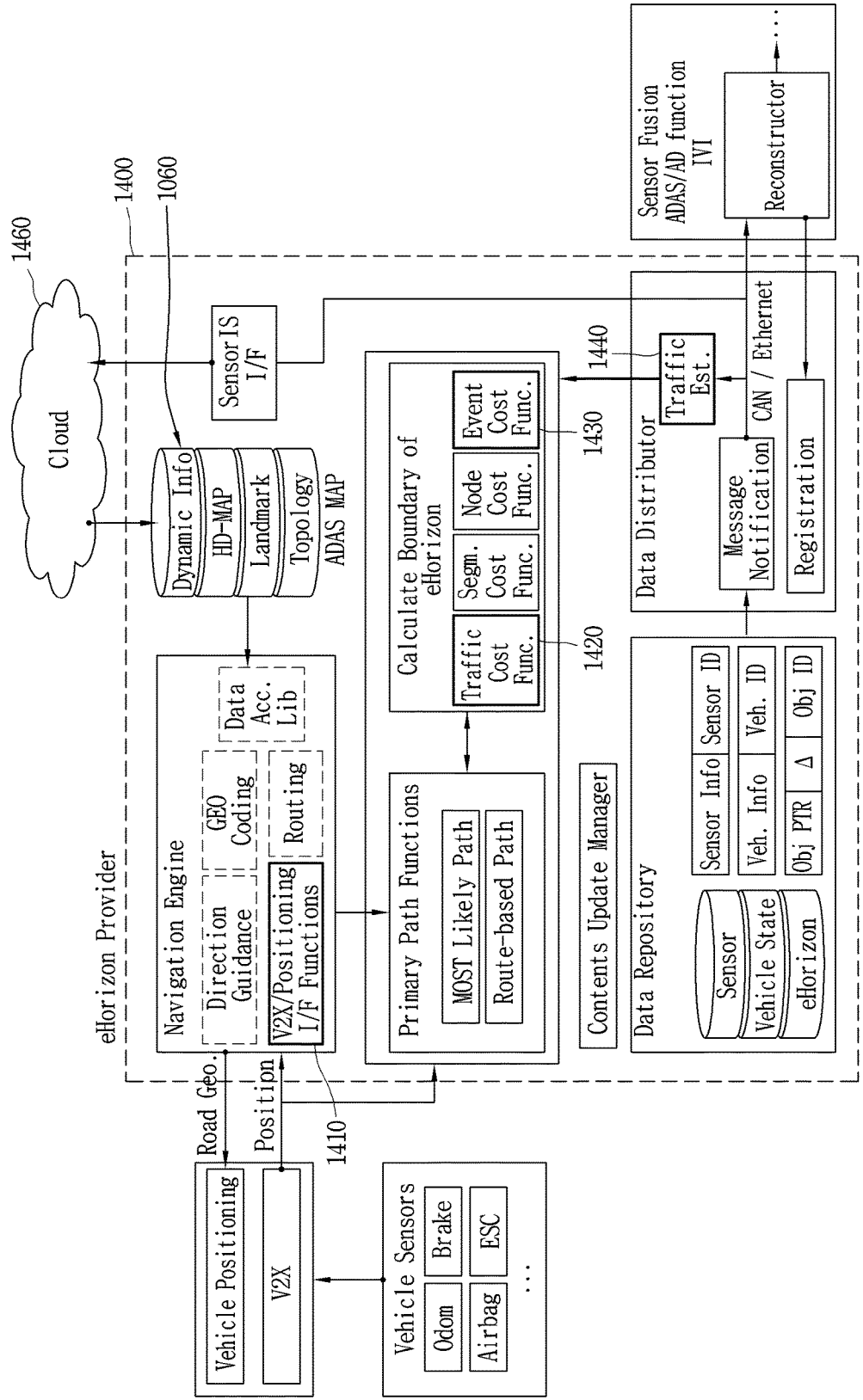
FIG. 14 is a block diagram for explaining a method of determining a range in which a vehicle control device according to an embodiment of the present disclosure receives an ADAS MAP from an external server.

FIG. 14 is a block diagram for explaining a method of determining a range in which a vehicle control device according to an embodiment of the present disclosure receives an ADAS MAP from an external server.

FIG. 14 illustrates a block diagram in which the processor 870 of the present disclosure is subdivided into various blocks.

The processor 870 may include an eHorizon Provider. The eHorizon Provider may perform a function of converting information (ADAS MAP 1060) received through an external server (eHorizon, cloud) to conform to the ADASIS standard.

Here, the eHorizon Provider may include a block capable of determining a reception range of the ADAS MAP received from eHorizon.

The block may include a function 1420 of calculating a traffic of a communication volume (or communication channel) and a function 1430 of calculating a cost of an event.

The traffic of communication volume and the cost of the event may be proportional to a traffic volume 1440.

The processor 870 may determine a range of map information to receive from the external server (eHorizon) based on the traffic of communication volume and the cost of the event.

For example, when at least one of the traffic of communication volume and the cost of the event is less than a reference volume (for example, in case of a highway), the processor 870 may receive map information (ADAS MAP) in a range having a first angle and a radius of a predetermined distance (for example, a range of a long distance at a small angle) from the external server (eHorizon).

For another example, when at least one of the traffic of communication volume and the cost of the event is greater than a reference volume (for example, in case of a downtown area), the processor 870 may receive map information (ADAS MAP) in a range having an angle larger than the first angle and a radius of the predetermined distance (or a range having a radius of a distance shorter than the predetermined distance)(for example, a range of a short distance at a large angle) from the external server (eHorizon).

In other words, the processor 870 of the present disclosure may control a search range in a narrow and long manner on a highway, and control the search range in a wide and short manner on a city road based on at least one of the traffic of traffic volume and the cost of the event.

Furthermore, the processor 870 of the present disclosure may reduce the speed (or request a conversion to manual driving in case of autonomous driving) when there is a high risk situation in front of the vehicle, and perform a search in detail within a short range.

In addition, the processor 870 of the present disclosure may increase the speed (or notify an autonomous driving enabled section) when there is a low risk situation in front of the vehicle, and perform a search in a narrow and long manner according to preset route information.

According to an embodiment of the present disclosure, there is one or more of the following effects.

The present disclosure may merge a relative location of another vehicle received through the V2X module and a detailed map received from an external server through the eHorizon module to acquire information capable of determining road information in the lane unit.

In addition, the present disclosure may provide an interface capable of autonomously driving a vehicle in an optimized manner or outputting a warning message associated with driving to a driver in an optimized situation based on information capable of determining road information in the lane unit.

The effects of the present invention may not be limited to those effects, and other effects which have not been mentioned can be obviously understood by those skilled in the art from the appending claims.

The foregoing vehicle control device 800 may be included in the vehicle 100.

Furthermore, the foregoing operation or control method of the vehicle control device 800 will be analogically applied to the operation and control method of the vehicle 100 (or controller 170) in the same or similar manner.

For example, the control method of the vehicle 100 (or the control method of the vehicle control device 800) may include acquiring the location information of the vehicle through a communication unit, and receiving map information from an external server and the location information of another vehicle from the another vehicle, sensing information associated with the vehicle, and merging the acquired location information of the vehicle and the received location information of the another vehicle into the received map information, and controlling the vehicle based on at least one of the merged map information and the sensed information associated with the vehicle.

The above process may be carried out by the controller 170 provided in the vehicle 100 as well as by the vehicle control device 800.

Furthermore, every function, configuration or control method executed by the vehicle control device 800 may be executed by the controller 170 provided in the vehicle 100. In other words, every control method disclosed herein may be applicable to the control method of the vehicle, and also applicable to the control method of the control device.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device for a vehicle, the vehicle control device comprising:
    a communicator configured to obtain location information of the vehicle and communicate with an external server and one or more other vehicles;
    a sensor configured to sense vehicle-associated information;
    a processor; and
    a non-transitory computer-readable medium coupled to the processor having stored thereon instructions which, when executed by the processor, causes the processor to perform operations comprising:

instructing the communicator unit to obtain map information from the external server and respective location information of the one or more other vehicles from the one or more other vehicles;

merging the location information of the vehicle and the respective location information of the one or more other vehicles with the map information to generate merged map information; and controlling the vehicle based on at least one of the merged map information or the vehicle-associated information, the controlling comprising:

based on the merged map information, determining that (i) a distance between the vehicle and the one or more other vehicles is less than a preset distance, and (ii) the vehicle and the one or more other vehicles are located in a same lane unit; and based on the determination that (i) the distance between the vehicle and the one or more other vehicles is less than the preset distance, and (ii) the vehicle and the one or more other vehicles are located in the same lane unit, outputting a warning message associated with driving of the vehicle.

2. The vehicle control device of claim 1, wherein the map information comprises lane unit information, and wherein the merging of the location information of the vehicle and the respective location information of the one or more other vehicles with the map information is based at least on the lane unit information.

3. The vehicle control device of claim 1, wherein the merging further comprises merging the vehicle-associated information sensed within a predetermined range with the map information, and wherein the controlling of the vehicle is based on the merged map information.

4. The vehicle control device of claim 1, wherein the controlling of the vehicle further comprises autonomously driving the vehicle.

5. The vehicle control device of claim 1, wherein the communicator is further configured to:

obtain respective Local Dynamic Map (LDM) data from the one or more other vehicles; and obtain an Advanced Driver Assistance System (ADAS) MAP from the external server, wherein the respective LDM data comprise the respective location information of the one or more other vehicles, and the ADAS MAP comprises the map information.

6. The vehicle control device of claim 5, wherein the operations comprise converting a coordinate system of the ADAS MAP into respective coordinate systems of the respective LDM data, or converting the respective coordinate systems of the respective LDM data into the coordinate system of the ADAS MAP.

7. The vehicle control device of claim 6, wherein the map information comprises lane unit information, and wherein the operations comprise:

extracting respective relative location information between the vehicle and the one or more other vehicles based on the respective LDM data;

determining respective lane unit placements of the vehicle and the one or more other vehicles based on the lane unit information and the respective LDM data;

aligning the respective relative locations of the vehicle and the one or more other vehicles based on the respective lane unit placements of the vehicle and the one or more other vehicles; and merging the respective relative locations of the vehicle and the one or more other vehicles with the map information to generate the merged map information.

8. The vehicle control device of claim 7, wherein the controlling of the vehicle comprises autonomously driving the vehicle based on the merged map information comprising the aligned respective relative locations of the vehicle and the one or more other vehicles.

9. The vehicle control device of claim 7, wherein determining that (i) the distance between the vehicle and the one or more other vehicles is less than the preset distance, and (ii) the vehicle and the one or more other vehicles are located in the same lane unit is based on the merged map information comprising the aligned respective relative locations of the vehicle and the one or more other vehicles.

10. The vehicle control device of claim 8, wherein controlling the vehicle based on at least one of the merged map information or the vehicle-associated information further comprises:

based on a determination that (i) the distance between the vehicle and the one or more other vehicles is less than the preset distance, and (ii) the vehicle and the one or more other vehicles are not located in the same lane unit, withholding the warning message associated with driving of the vehicle.

11. The vehicle control device of claim 8, wherein controlling the vehicle based on at least one of the merged map information or the vehicle-associated information further comprises:

based on a determination that the vehicle and the one or more other vehicles are not located in the same lane unit, withholding the warning message associated with driving of the vehicle.

12. A vehicle comprising:

a plurality of wheels;

a power source configured to drive the plurality of wheels; and the vehicle control device of claim 1.

13. A method of controlling a vehicle, the method comprising:

obtaining, through a communicator, location information of the vehicle, map information from an external server, and respective location information of one or more other vehicles from the one or more other vehicles;

sensing, through a sensor, vehicle-associated information;

merging the location information of the vehicle and the respective location information of the one or more other vehicles with the map information to generate merged map information; and controlling the vehicle based on at least one of the merged map information or the vehicle-associated information, the controlling comprising:

based on the merged map information, determining that (i) a distance between the vehicle and the one or more other vehicles is less than a preset distance, and (ii) the vehicle and the one or more other vehicles are located in a same lane unit; and based on the determination that (i) the distance between the vehicle and the one or more other vehicles is less than the preset distance, and (ii) the vehicle and the one or more other vehicles are located in the same lane unit, outputting a warning message associated with driving of the vehicle.

14. The method of claim 13, wherein the map information comprises lane unit information, and wherein the merging of the location information of the vehicle and the respective location information of the one or more other vehicles with the map information is based at least on the lane unit information.

15. The method of claim 13, wherein the merging further comprises merging the vehicle-associated information sensed within a predetermined range with the map information, and wherein the controlling of the vehicle is based on the merged map information.

16. The method of claim 13, wherein the controlling of the vehicle further comprises autonomously driving the vehicle.

17. The method of claim 13, further comprising:
   obtaining, through the communicator, respective Local Dynamic Map (LDM) data from the one or more other vehicles; and
   obtaining, through the communicator, an Advanced Driver Assistance System (ADAS) MAP from an external server,
   wherein the respective LDM data comprise the respective location information of the one or more other vehicles, and
   the ADAS MAP comprises the map information.

18. The method of claim 17, further comprising converting a coordinate system of the ADAS MAP into respective coordinate systems of the respective LDM data, or converting the respective coordinate systems of the respective LDM data into the coordinate system of the ADAS MAP.

19. The method of claim 18, wherein the map information comprises lane unit information, and wherein the method further comprises:
   extracting respective relative location information between the vehicle and the one or more other vehicles based on the respective LDM data;
   determining respective lane unit placements of the vehicle and the one or more other vehicles based on the lane unit information and the respective LDM data;
   aligning the respective relative locations of the vehicle and the one or more other vehicles based on the respective lane unit placements of the vehicle and the one or more other vehicles; and
   merging the respective relative locations of the vehicle and the one or more other vehicles with the map information to generate the merged map information.

20. The method of claim 19, wherein determining that (i) the distance between the vehicle and the one or more other vehicles is less than the preset distance, and (ii) the vehicle and the one or more other vehicles are located in the same lane unit is based on the merged map information comprising the aligned respective relative locations of the vehicle and the one or more other vehicles.

\* \* \* \* \*